(12) United States Patent
Bowers et al.

(10) Patent No.: US 12,061,682 B2
(45) Date of Patent: Aug. 13, 2024

(54) SYSTEM AND METHOD TO PERFORM DIGITAL AUTHENTICATION USING MULTIPLE CHANNELS OF COMMUNICATION

(71) Applicant: Capital One Services, LLC, McLean, VA (US)

(72) Inventors: Justin Anthony Bowers, St. Cloud, MN (US); James Ashfield, Midlothian, VA (US); Melissa Yoemans Heng, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 90 days.

(21) Appl. No.: 17/379,537

(22) Filed: Jul. 19, 2021

(65) Prior Publication Data
US 2023/0020843 A1    Jan. 19, 2023

(51) Int. Cl.
| | |
|---|---|
| H04L 9/32 | (2006.01) |
| G06F 8/61 | (2018.01) |
| G06F 9/445 | (2018.01) |
| G06F 21/32 | (2013.01) |
| G06F 21/35 | (2013.01) |

(52) U.S. Cl.
CPC .......... *G06F 21/35* (2013.01); *G06F 8/61* (2013.01); *G06F 9/445* (2013.01); *G06F 21/32* (2013.01); *H04L 9/3226* (2013.01)

(58) Field of Classification Search
CPC ........ G06F 21/31; G06F 21/305; G06F 21/32; G06F 21/34; G06F 21/35; G06F 21/42
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

International Search Report and Written Opinion dated Sep. 28, 2022, for Application No. PCT/US2022/032762 (13 pages).

(Continued)

*Primary Examiner* — Nelson S. Giddins
(74) *Attorney, Agent, or Firm* — KDW FIRM PLLC

(57) ABSTRACT

Embodiments are generally directed to techniques and devices to communicate a first communication to a mobile device, the first communication including first data to cause the mobile device to download a mobile application, communicate a second communication to the mobile device, the second communication comprising second data comprising a task identifier, the second data to cause the mobile application to perform an authentication task associated with the task identifier, determine the user is authenticated by the authentication task, and enable the mobile device to perform sensitive actions.

20 Claims, 14 Drawing Sheets

(56) References Cited

U.S. PATENT DOCUMENTS

| | | | |
|---|---|---|---|
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,581,611 B1 | 3/2020 | Osborn |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |

(56) References Cited

U.S. PATENT DOCUMENTS

| | | |
|---|---|---|
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Androck et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0197267 A1* | 8/2011 | Gravel ............... H04L 9/3226 726/5 |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0020068 A1 | 1/2014 | Desai et al. |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0156396 A1 | 6/2014 | deKozan et al. |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229437 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |

(56) References Cited

U.S. PATENT DOCUMENTS

| | | |
|---|---|---|
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Ansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0089699 A1* | 3/2019 | Krishnamurthy ....... H04W 4/16 |
| 2019/0180278 A1* | 6/2019 | Park ....................... G06Q 20/401 |
| 2019/0238517 A1 | 8/2019 | D'Agostino et al. |
| 2020/0104474 A1 | 4/2020 | Duane |
| 2020/0104826 A1 | 4/2020 | Rule |
| 2020/0111095 A1 | 4/2020 | Osborn |
| 2020/0184462 A1 | 6/2020 | Rule |
| 2020/0226581 A1 | 7/2020 | Rule |
| 2020/0242588 A1 | 7/2020 | Rule |
| 2020/0250672 A1 | 8/2020 | Rule |
| 2020/0302436 A1 | 9/2020 | Ilincic |
| 2020/0304310 A1 | 9/2020 | Rule |
| 2020/0304311 A1 | 9/2020 | Rule |
| 2020/0380591 A1 | 12/2020 | Rule |
| 2021/0004218 A1 | 1/2021 | Ilincic |
| 2021/0004786 A1 | 1/2021 | Mossler |
| 2021/0004803 A1 | 1/2021 | Rule |
| 2021/0012401 A1 | 1/2021 | Osborn |
| 2021/0019731 A1 | 1/2021 | Rule |
| 2021/0019735 A1 | 1/2021 | Hart |
| 2021/0019756 A1 | 1/2021 | Rule |
| 2021/0168140 A1* | 6/2021 | Canfield ................. G06F 21/31 |
| 2021/0192494 A1* | 6/2021 | Capurso ............ G06Q 20/4014 |
| 2021/0192495 A1 | 6/2021 | Cody |
| 2021/0192508 A1 | 6/2021 | Edwards |
| 2021/0192518 A1 | 6/2021 | Rule |
| 2021/0192519 A1 | 6/2021 | McHugh |
| 2021/0201296 A1 | 7/2021 | Rule |
| 2021/0203505 A1 | 7/2021 | Mossler |
| 2021/0319427 A1 | 10/2021 | Rule |
| 2021/0342809 A1 | 11/2021 | Rule |
| 2021/0342816 A1 | 11/2021 | Benkreira |
| 2021/0342817 A1 | 11/2021 | Rule |
| 2021/0342840 A1 | 11/2021 | Rule |
| 2022/0138726 A1 | 5/2022 | Rule |
| 2022/0139511 A1 | 5/2022 | Osborn |
| 2022/0215217 A1 | 7/2022 | Hart |
| 2022/0247741 A1 | 8/2022 | Moreton |
| 2022/0272083 A1 | 8/2022 | Rule |
| 2022/0284178 A1 | 9/2022 | Rule |
| 2022/0335412 A1 | 10/2022 | Rule |
| 2022/0335432 A1 | 10/2022 | Rule |
| 2022/0337581 A1 | 10/2022 | Guo |
| 2022/0345309 A1 | 10/2022 | Rule |
| 2022/0366410 A1 | 11/2022 | Rule |
| 2022/0414648 A1 | 12/2022 | Rule |
| 2022/0417024 A1 | 12/2022 | Yee |
| 2023/0020843 A1 | 1/2023 | Bowers |
| 2023/0065163 A1 | 3/2023 | Vargas |
| 2023/0083785 A1 | 3/2023 | Maiman |
| 2023/0162187 A1 | 5/2023 | Rule |
| 2023/0169505 A1 | 6/2023 | Rule |
| 2023/0169596 A1 | 6/2023 | Rule |
| 2023/0188340 A1 | 6/2023 | Osborn |
| 2023/0298417 A1 | 9/2023 | Osborn |
| 2023/0325810 A1 | 10/2023 | Barrett |
| 2023/0376936 A1 | 11/2023 | Lutz |
| 2023/0401564 A1 | 12/2023 | Barrett |
| 2023/0418923 A1 | 12/2023 | Ogbennah |
| 2023/0419295 A1 | 12/2023 | Rule |
| 2024/0021041 A1 | 1/2024 | Chigurupati |
| 2024/0054493 A1 | 2/2024 | Osborn |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |

(56) References Cited

FOREIGN PATENT DOCUMENTS

| | | | |
|---|---|---|---|
| EP | 1469419 | A1 | 8/2012 |
| EP | 2852070 | A1 | 3/2015 |
| GB | 2457221 | A | 8/2009 |
| GB | 2516861 | A | 2/2015 |
| GB | 2551907 | A | 1/2018 |
| KR | 101508320 | B1 | 4/2015 |
| WO | 0049586 | A1 | 8/2000 |
| WO | 2006070189 | A2 | 7/2006 |
| WO | 2008055170 | A2 | 5/2008 |
| WO | 2009025605 | A2 | 2/2009 |
| WO | 2010049252 | A1 | 5/2010 |
| WO | 2011112158 | A1 | 9/2011 |
| WO | 2012001624 | A1 | 1/2012 |
| WO | 2013039395 | A1 | 3/2013 |
| WO | 2013155562 | A1 | 10/2013 |
| WO | 2013192358 | A2 | 12/2013 |
| WO | 2014043278 | A1 | 3/2014 |
| WO | 2014170741 | A2 | 10/2014 |
| WO | 2015179649 | A1 | 11/2015 |
| WO | 2015183818 | A1 | 12/2015 |
| WO | 2016097718 | A1 | 6/2016 |
| WO | 2016160816 | A1 | 10/2016 |
| WO | 2016168394 | A1 | 10/2016 |
| WO | 2017042375 | A1 | 3/2017 |
| WO | 2017042400 | A1 | 3/2017 |
| WO | 2017157859 | A1 | 9/2017 |
| WO | 2017208063 | A1 | 12/2017 |
| WO | 2018063809 | A1 | 4/2018 |
| WO | 2018137888 | A1 | 8/2018 |
| WO | 2020190788 | A1 | 9/2020 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from

(56) References Cited

OTHER PUBLICATIONS

Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

* cited by examiner

SYSTEM AND METHOD TO PERFORM DIGITAL AUTHENTICATION USING MULTIPLE CHANNELS OF COMMUNICATION

BACKGROUND

Today's banks provide a number of services online through the Internet. For example, a customer may download a banking application on their mobile device and interface with a banking system to perform tasks, such as check their account balance, change their personal information, update their settings, pay bills, and so forth. However, current banking systems require users to setup an online account with personal information to login into to perform these tasks. However, a subset of customers typically performs their banking tasks using traditional methods, e.g., by going to the bank and speaking with a teller in person or calling a banking representative on the phone. The experience for these customers is typically more inconvenient. One downside is that the customers are still required to go through an authentication process that generally requires the user to provide some piece of information to be authenticated. For example, current systems and methods for authenticating a customer include requesting sensitive data from the customer, such as an account number, a transaction card number, a social security number, a mother's maiden name, a password, and/or other personal data. Because certain information may be known by fraudsters, "something you know" authentication techniques force obscure questions such as "What is your grandfather's middle name?" Also, if customers forget the answers to certain questions such as "Who was your favorite teacher?" the customer could be prevented from performing a task. Current authentication processes, therefore, are not only burdensome for customers but also time-consuming and costly for companies providing customer service to these customers. These and other drawbacks exist.

BRIEF SUMMARY

Embodiments may be generally directed to systems, devices, and techniques including a system configured to authenticate unauthenticated users to perform sensitive actions. The system may include one or more processors, and memory coupled with the one or more processors. The memory is configured store instructions that when executed by the one or more processors, cause the one or more processors to communicate a first communication to a mobile device, the first communication comprising first data to cause the mobile device to download a mobile application, communicate a second communication to the mobile device, the second communication comprising second data comprising a task identifier, the second data to cause the mobile application to perform an authentication task associated with the task identifier, and determine the user is authenticated by the authentication task. In response to the user being authenticated the one or more processors may enable the mobile device to perform sensitive actions.

Embodiments may be generally directed to systems, devices, and techniques including a computing device configured to authenticate unauthenticated users to perform sensitive actions. The computing device may include processing circuitry, and memory coupled with the processing circuitry. The memory is configured store instructions that when executed by the processing circuitry, cause the processing circuitry to receive a first communication from a system to authenticate a user, the first communication comprising first data to install a mobile application, install the mobile application based on invocation of the first data, receive a second communication from the system, the second communication comprising second data comprising a task identifier, the second data to cause the mobile application to perform an authentication task associated with the task identifier, initiate the authentication task based on invocation of the second data to determine the user is authenticate, and receive an indication that the user is authenticated based on performance of the authentication task, and the user is enabled to perform sensitive actions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
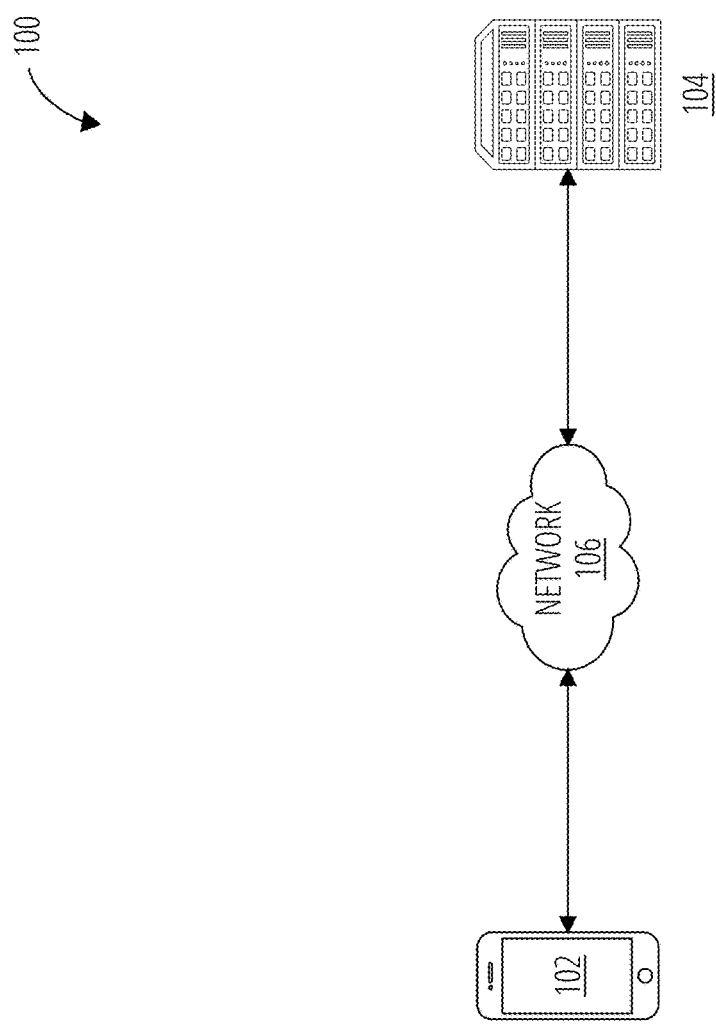
FIG. 1 illustrates an example of a system 100 in accordance with embodiments.

Today's technology makes it easier for users and customers to take advantage of many different services in a secure manner. For example, most people have mobile devices configured with different types of mobile applications that allow users to perform many daily tasks. Users may communicate with their friends, family, and work colleagues through applications, such as text messaging applications, phone applications, video calling applications, email applications, and so forth. Users may also spend their leisure time playing games on one of the multitudes of available gaming applications. Mobile devices, when configured correctly, also provide a secure platform to enable users to perform more sensitive tasks, such as interfacing with their bank through a banking application, speaking with their doctor through a medical application, making investments with their broker through their brokerage account application, and so forth. However, these more secure applications typically need to be linked to the service provider's system through a secure interface and require an established level of trust with the customers to ensure that they are authorized users to perform the task. Typically, a service provider will have a user establish an account with a single sign-on username and password that must be correctly entered into the application each time a user wants to perform a sensitive task, e.g., review/change personal information, perform an action with their bank account, discuss private medical information, etc.

However, for any number of reasons, a subset of these users never establishes an account and SSO with the service provider. Therefore, these users cannot fully utilize the features of the mobile application to perform the more sensitive tasks. In some instances, the setup process may be too confusing or take too long. Some other users may trust performing these tasks in-person or speaking to another person on the phone or in a chat window. However, these users are generally difficult to authenticate in a quick, secure, and effective manner. Embodiments discussed solve these issues by utilizing a communication channel other than the voice or chat channel established with the customer to authenticate the customer.

Specifically, embodiments may be directed to systems, devices, and techniques to perform authentication operations for unauthenticated users. Embodiments include providing a mobile application associated with the service provider and then performing an authentication operation with the mobile application to authenticate the user. In one example, a system, such as a banking system or other service-providing system, may generate and communicate a first communication to a user's device in response to the user wanting to perform a sensitive task. The first communication includes an embedded link that may cause the mobile device to download and install a mobile application associated with the system. The system may generate and send a second communication to the device. The second communication may include an embedded link to cause the application to launch or execute on the device. The second communication may also include data, such as a task identifier, that may be provided to the application to locate and execute the instructions to perform the authentication operation.

Specifically, the application on the mobile device utilizes the task identifier to identify a task to perform for the user, e.g., the authentication operation to authenticate the user. The authentication operation may include the user providing a token or other authentication information that may be authenticated by the system or another authentication server or service. Upon authentication, the application may be enabled to perform the sensitive task for the customer. These and other details will be discussed more fully in the following description.

FIG. 1 illustrates a schematic of an exemplary system 100, consistent with disclosed embodiments. As shown, system 100 includes a computing device 102 and a system 104 that may communicate with each other via network 106 (e.g., via the Internet). The network 106 may include one or more wireless and/or wired interconnects configured to enable communication between devices, such as the computing device 102 and the system 104. The computing device 102 is representative of any type of network-enabled computing devices, such as mobile devices, mobile phones, smartphones, tablet computers, wearable devices, laptops, portable gaming devices, and the like. Further, FIG. 1 illustrates one computing device 102; however, embodiments are not limited in this manner. In practice, system 100 may include one or more computing device 102, which can communicate with system 104. The system 104 may include one or more servers having processing circuitry (processors), memory, storage, interfaces, etc. System 104 is representative of any type of computing system, such as a server farm, workstation, compute cluster, cloud computing platform, a virtualized computing system, and the like.

Figure 2:
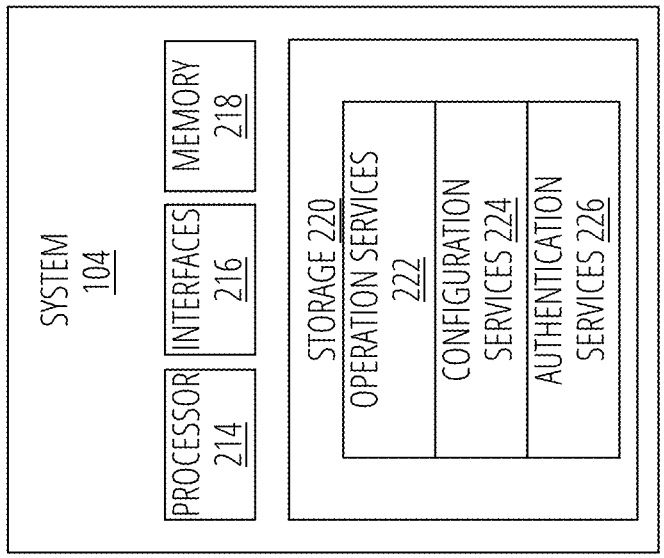
FIG. 2 illustrates an example configure of a computing device 102 and a system 104 in accordance with embodiments.
Figure 2:
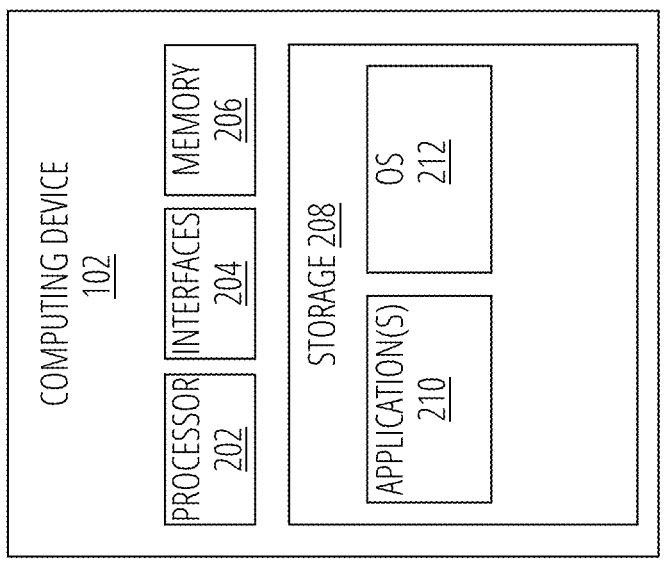

FIG. 2 illustrates examples details of components of the computing device 102 and the system 104 to perform the operations discussed herein. Note that FIG. 2 only illustrates a limited number of components for illustrative purposes and computing device 102 and system 104 can include other components, devices, circuitry, controllers, networking devices, memory, etc. As shown, the computing device 102 may include processor(s) 202, interfaces 204, and memory 206. In some instances, the computing device 102 may include more than one processor 202, each having one or more cores. The processor(s) 202 may be coupled with the interfaces 204 and the memory 206. The memory 206 may be any type of memory, including volatile and non-volatile memory configured to store instructions for processing by the processor(s) 202. The interfaces 204 may include wired and wireless networking interfaces configured to communicate to other devices including computing device 102. Moreover, the interfaces 204 may be configured to communicate in accordance with one or more protocols, such as cellular communication protocols (e.g., WiMAX/LTE/5G), local area network protocols (e.g., 102.11 series), and short-range communication protocols (e.g., near-field communication (NFC)/Bluetooth).

Further, the computing device 102 includes storage 208 such as a hard disk drive, a solid-state drive, or the like. The storage 208 is configured to store software, such as application(s) 210 and an operating system 212. Examples of an operating system 212 include the Android® OS, iOS®, macOS®, Linux®, and Windows® operating systems.

The application(s) 210 may be referred to as mobile applications, mobile apps, apps, applets, or the like. The application(s) 210 includes communication applications, such as a texting application, a web browser application, a telephone application, an electronic mail (e-mail) application, a video chat application, a text chat application, and so forth. The texting application may be configured to send and receive data and messages in accordance with one or more message protocols (e.g., short message service (SMS), rich communication services (RCS), and multimedia messaging service (MMS)). Other applications of the computing device 102 may include gaming applications, multimedia applications, camera or image applications, and so forth. In computing device 102 may also include applications to access services. For example, service provider applications a banking application, a stock management application, a mobile payment service application, human resource application, a medical application, and so forth. In embodiments, the computing device 102 enables users to delete application, update applications, and download and install new applications. For example, the computing device 102 have an application store to control the applications on the computing device 102. Examples of an application store include the Google® Play Store, the Apple® App Store, the Amazon® Apps & Games Store, etc. In embodiments, the applications 210 enable users of the computing device 102 to interact with the device and perform actions. For example, users may utilize the application(s) 210 to send and receive emails, send and receive text messages, play games, review/edit documents, send and receive money, make phone calls, and so forth. In general, each of the application(s) 210 may provide a service or feature for a user.

In embodiments, the users can download and install one or more of the application(s) 210 to conduct or perform sensitive actions or high-risk actions. These applications may be provided by service providers, and interface with the service provider's system. A sensitive action may be any action or service that requires the user to be authenticated to perform. A sensitive action may be an action that will enable the user to view, change, and/or interact with private/personal information, financial information, health information, sensitive corporate information, etc. Examples may include providing personal information to the user, enabling the user to wire or send money to another person, applying for a loan, perform checking/saving account operations, and so forth. Embodiments discussed herein enable users that typically do not take advantage of these services provide through applications 210 to be quickly and easily be authorized.

As previously discussed, typically users configure an account with a username/password such that they can log into a secure area of a website or application to perform the sensitive actions. However, some users never configure or establish an account or username/password and are unauthenticated. Thus, when these users want to perform a sensitive action, they are not trusted until they go through an authentication operation. Embodiments discussed herein enable system 104 to authenticate users via computing devices 102 and based on a trusted piece of data or information, e.g., providing a token from a contactless card, verifying government-issued identification information, providing a biometric, etc. System 104 first determines that a customer is not authenticated and then performs operations to authenticate the customer, including installing application on the customer's computing device 102 to perform the authentication, causing an authentication operation to be performed, and enabling the user to perform the sensitive task if they are authenticated.

In embodiments, the system 104 may be a sub-system of the service providers system. For example, the system 104 may be part of a call or help center operated by the service provider and is setup to handle calls and chats to help customers perform the various actions. In one example, the system 104 may enable human or computer operators to speak or chat with users and to perform authentication operations discussed herein including enabling the users to perform sensitive actions. The system 104 may include one or more devices, such as servers having one or more processor(s) 214, interfaces 216, and memory 218. The system 104 also includes storage 220 that may store applications and/or instructions to perform the operations discussed herein.

The storage 220 may include operation services 222, configuration services 224, and authentication services 226. The operation services 222 include instructions configured to enable operators to interface with customers and provide services. The configuration services 224 include instructions configured to facilitate the configuration of the computing devices for users to install an application and perform authentication operations via the application. The authentication services 226 include instructions to perform authentication operations and/or process the results of authentication operations for the system 104.

In embodiments, the operation services 222 provides a graphical user interface (GUI) for an operator to interact and communicate with users and computing devices. Moreover, the operation services 222 provide an interface for the users to communicate with the operators. For example, the operation services 222 may include instructions to handle and process phone calls and chat sessions. The operations services 222 may be configured to receive a phone call or chat initiation and direct the call or chat to an operator.

The operations services 222 may also enable the operator to communicate with the users, e.g., send communications (voice or data) back and forth between the system 104 and computing devices 102. In some embodiments, at least a portion of the operation services 222 may be automated to automatically communicate with users either via voice communication channels or data communication channels. For example, the operation services 222 may automatically detect requests made by users, generate responses based on the requests, and communicate the responses back to the users. The responses may be interactive responses and are responsive based on the requests made by the users. The operation services 222 may include instructions that are configured to convert the user's spoken word into text and then analyze the text to determine a response. The instructions may also be configured to generate responses based on analyzed text and communicate the response verbally on the phone or though chat in a chat window.

In embodiments, the operation services 222 may also be configured to determine whether users are authenticated to perform sensitive actions. For example, the operations services 222 may provide an interface for an operator to search and/or perform a lookup in a database to determine whether a particular is authenticated to perform a sensitive and/or their computing device is configured to perform the authentication operations. In some embodiments, the operation services 222 includes instructions to automatically perform the lookup based on the analysis of the user's speech/text. Embodiments discussed herein facilitate instances when the user is not authenticated and their computing device 102 is not configured to perform authentication operation, e.g., the user does not have an account established with an SSO.

In one specific example, a user may call or initiate a chat to perform a sensitive task. The operation services 222 are configured to provide an operator or agent of the system 104 to interface with the user and to perform task. For example, the operation services 222 may perform a lookup in a database to determine if the user is authenticated to perform the sensitive task. The operator may perform the search through a GUI interface and determine if the customer has configured an account with the service provider and/or has an SSO established. In some instances, one or more of the operations may be automated. For example, the operation services 222 may include instructions to automatically determine if the user is authenticated (e.g., by interpreting the action to be performed and automatically performing the lookup to determine if the user has an account). If the user is authenticated, the user may be permitted to perform the sensitive task. However, embodiments discussed herein aim to help users that are not unauthenticated with system 104 and/or do not have a trust relationship established with the service provider. The system 104 also includes the configuration services 224 and the authentication services 226 to authenticate the user and enable the user to perform the sensitive task.

The configuration services 224 include instructions to configure a computing device 102 of the user to authenticate the user. Specifically, the configuration services 224 generate and communicate information to the user's computing device 102 to install a mobile application associated with the service provide. In embodiments, the configuration services 224 may generate a text message including an indication to download the application. For example, the text message may include an embedded link that, when activated, causes the computing device 102 to download the application. The text message may include text, such as "Here's a link to install our application: https://appstore/application." A user may select the embedded link and automatically be directed to the application store to download the application. The embedded link may be a location to directly download the application (e.g., a home page to download the app). In some instances, the embedded link may be configured to cause the computing device 102 to automatically redirect to the application store without the user selecting the embedded link.

The text message may be communicated to the computing device 102 via a text message service, such as SMS, MMS, or RCS. In some instances, the configuration services 224 may automatically detect the phone number from which the user is calling and send the text message to the computing device 102. In other instances, the operator may ask the user for the phone number, the user may provide the number, and the operator may manually and/or automatically enter the provided number into the system 104 to send the message. In some embodiments, the configuration services 224 may apply voice-to-text instructions to the user's provided number and automatically send the message to the given phone number. Note that embodiments are not limited to utilizing text messages. In some instances, a quick response (QR) code including the embedded link may be generated by the configuration services 224 and provided to the user on a display. The user may use a scanning application and a camera to scan the QR code, which may automatically read the embedded link and redirect to the application download store to download the application.

In embodiments, the system 104, including the configuration services 224, may determine that the application is installed on the computing device 102. For example, the user may tell the operator that the application is successfully installed, and the operator may input an indication into the system 104. In other instances, the configuration services 224 may receive an indication from the installed application that it is successfully installed. The indication may be provided to system 104 by the application communicating with the system 104 through an application programming interface (API), for example. Once the application is installed, the system 104 may initiate an authentication operation with the computing device 102 to authenticate the user. The authentication operation includes having the user provide a trusted token to the system 104 (or another authentication system), and authenticating the user, e.g., is the person that was previously authenticated with the token.

In embodiments, the system 104 may utilize the downloaded application to perform the authentication operation. For example, the system 104 may include authentication services 226 that may generate another message to cause the application installed on the computing device 102 to perform the authentication operation. The authentication services 226 may generate or determine a task identifier associated with performing the authentication operation. In some instances, the task identifier may be predetermined, and the application may include instructions to execute the authentication operation upon receiving the task identifier. The task identifier may be a combination of alphanumeric characters to identify the authentication operation.

In embodiments, the authentication services 226 may generate a text message, embed the task identifier in the text message and communicate the text message to the computing device 102 for the application to process. The text message may include an embedded link to cause the application to execute and provide the task identifier to the application. If the application is already executing on the computing device 102, the embed link may pass the task identifier to the application. In one specific example, the text message may include an embedded link such as "app.launch/task identifer," that when activated or selected, will launch the application and provide the task identifier (task identifier) to the application. The task identifier may be an element of a function that will execute when the application is launched. The application may determine the task (e.g., authentication operation) corresponding to the task identifier and perform the task. Embodiments are not limited to embedding the task identifier in a text message, and the task identifier may also be embedded in a QR code. Again, the user may use QR scanning software to scan the code with a camera to receive the data, including the task identifier.

In embodiments, the authentication operation may execute on the computing device 102 to authenticate the user. For example, the application executing on the computing device 102 is configured to launch and execute instructions to authenticate the user based on the task identifier. The authentication operation includes the user providing a token or piece of information that can be used to authenticate the user. In one example, the service provider may be a bank, and the application may be a banking application configured to provide banking services for the user. The user may have a contactless card with the bank that can be used to authenticate the user. Specifically, the contactless card includes a token that can be provided to the authentication services 226, a different system, or authentication service to authenticate the user, e.g., a third-party system, a dedicated authentication server, or the like may authenticate the information or token. If a different system or service perform the authentication of the user, a result of the authentication operation may be communicating the application, the authentications services, or a combination therefor. Embodiments are not limited in this manner; however, in this example, the authentication services 226 may perform the authentication of the information or token.

In embodiments, the authentication services 226 may receive the token from the contactless card via the application on the computing device 102. The computing device 102 may read the token from the contactless card by performing one or more short-range communication read operations. The application may execute the authentication operation, causing a prompt to be displayed on the display of the computing device 102 for the user to provide the contactless card on the computing device 102, e.g., bring the contactless card within short-range communication operating range of the computing device 102. In one example, the computing device 102 may utilize NFC communications having an operating range of approximately 10 centimeters or less. In some embodiments, to ensure that the user brings the contactless card close enough to the computing device 102 to exchange data, the user is prompted to tap the card on the computing device 102, e.g., on the display or other surface of the computing device 102.

The computing device 102 receives a payload including a cryptogram from the contactless card. The cryptogram may include the token or authentication information, which may be one or more identification numbers, a counter value, a version number, and a shared secret, and be encrypted using diversified keys. The cryptogram may be generated, encrypted, and communicated by the contactless card to the computing device 102. In embodiments, the payload may include additional information, such as an unencrypted identifier. The unencrypted identifier may be a customer identifier to identify a customer associated with and stored on the contactless card. Embodiments are not limited in this manner.

The computing device 102 may communicate the cryptogram to the system 104 including the authentication services 226 via one or more secure communications (e.g., through one or more secure API communications). The authentication services 226 may decrypt the cryptogram from the contactless card and verify the token and/or authentication information matches stored verified data in the system 104. For example, the system 104 may determine one or more of the identification numbers, counter values, version number, and/or the shared secret match corresponding data in the system 104. If so, the system 104 verifies that the user is authenticated and can perform sensitive tasks. If not, the user is not authenticated and cannot perform the tasks.

In embodiments, alternative methods may be utilized by the system 104 to authenticate the user. For example, system 104 may utilize a photo verification system to authenticate the user. The application may prompt the user to take a photograph or picture of their government-issued (or other trusted) identification. The computing device 102 may communicate the picture to the system 104 to authenticate the user. The system 104 may use a photo ID verification service, such as BlueCheck®, or a similar service to verify the photo. Other alternative services may include verifying the user via a biometric input, such as a fingerprint, iris, facial picture, etc. Once the user is authenticated, the system 104 may enable the user to perform the sensitive operations. For example, the system 104 may set a flag or setting on the user's account that enables the user to perform tasks, such as wiring money, changing settings, paying bills, etc.

Figure 3:
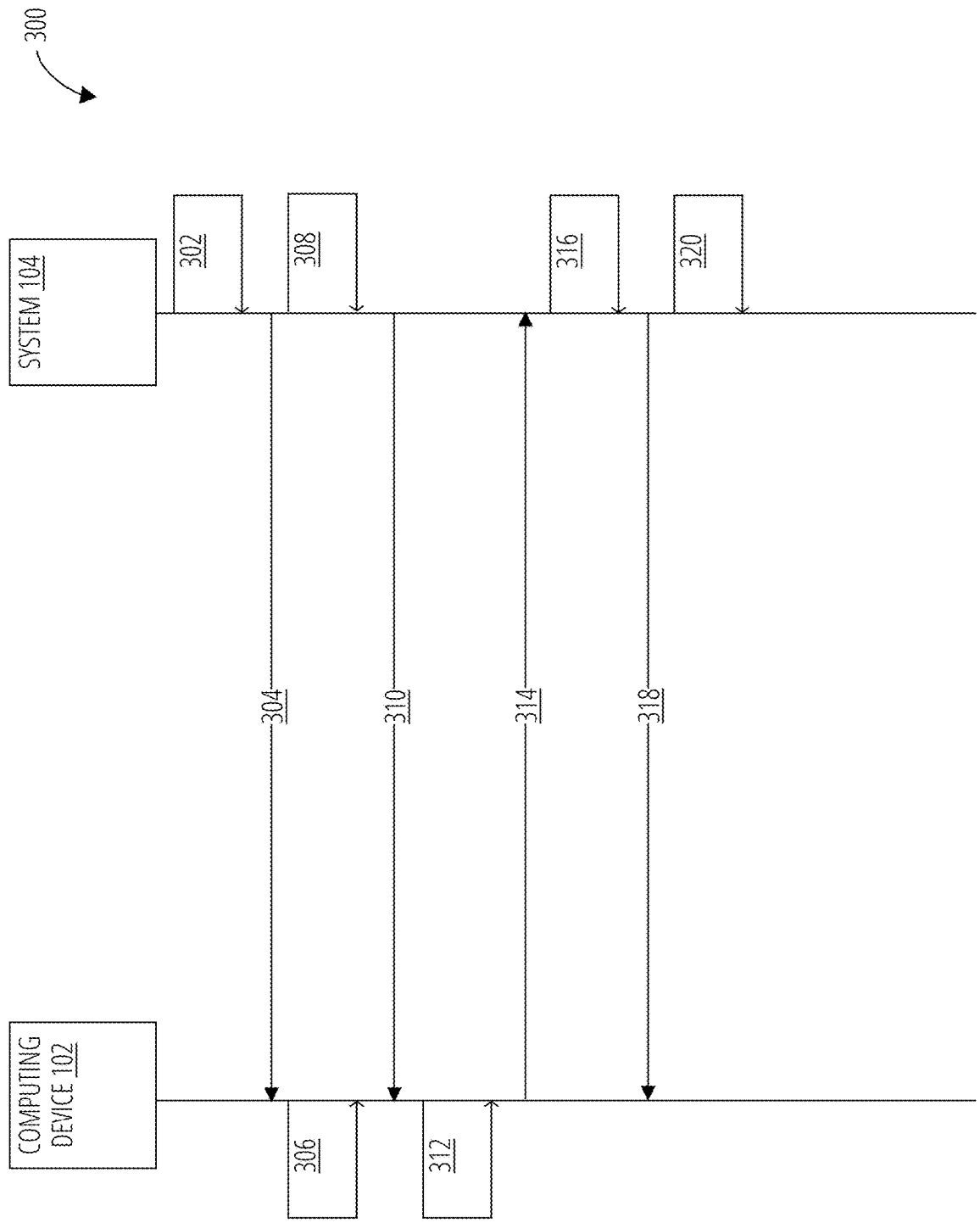
FIG. 3 illustrates an example of sequence flow 300 in accordance with embodiments.

FIG. 3 illustrates an example sequence flow 300 that may be performed to authenticate an unauthenticated user to perform sensitive tasks. Examples discussed herein are in reference to system 100, and computing device 102 and system 104; however, the techniques discussed may be performed by any system to authenticate a user to perform high-risk or sensitive services. In the illustrated example, the computing device 102 may be a mobile device configured to make telephone calls via voice channels and communicate data via data channels. The system 104 may include one or more servers configured to communicate with the computing device 102 via voice and/or data channels.

In embodiments, a user may communicate to an operator and the system 104 that they wish to perform a sensitive task. The communication may be made by the user speaking with the operator of the system 104 over a voice channel or through a chat window over a data channel. The system 104 may determine that the user is not authenticated. For example, the system 104 may determine that the user does not have an electronic online account configured to perform the sensitive task. Thus, the user has not previously provided identifying information to the service provider and system 104 that may be used to authenticate the user. For example, the user does not have a username/password configured to log in to an online account provided through a web browser or mobile application (e.g., a banking app). Moreover, the system 104 may determine that the user does not have the mobile application installed on the computing device 102 configured to perform the sensitive task, e.g., the user may provide the information to the operator.

At line 302, the system 104 generates a message to communicate to the 102, including information to download the application to perform the sensitive. In some instances, an operator may provide an input to system 104 through a GUI to generate the message to communicate to computing device 102. For example, the operator may be presented with a GUI interface configured to take a user's phone number as input to send the computing device 102 a text message. The phone number may be communicated to the operator via the voice communication channel. In other instances, the system 104 may generate the message automatically. For example, the system 104 may include voice-to-text instructions to convert the user's words to text. The text may be analyzed to determine that the user does not have the application installed on their computing device 102. In some instances, the information may be communicated to the system 104 through a chat or text-based interface and the system 104 may analyze the text to determine the user does not have the application installed on their computing device 102.

The system 104 may generate the message including an embedded link, that when selected or activated, causes the computing device 102 to redirect to a location to download the application. For example, the link may cause the operating system 212 to launch an application store to download the application. In some instances, the application store may execute and open to the specific location to perform the download, and the download may occur automatically without human intervention. In another example, the embedded link may direct the operating system 212 to open a website in a web browser to a web-based location to download the application.

At line 304, the system 104 may communicate the message to the computing device 102. As mentioned, the message may be communicated via a text message service in accordance with a text message protocol based. The text message may include the embedded link which, as discussed, may be an address or link to a location, a QR code, or the like, that includes information to cause the operating system 212 to start downloading the application. In some instances, the message may be communicated to a device other than computing device 102, such as a personal computer, and then the computing device 102 may receive the message by performing a scanning operation utilizing a camera to read a QR code or the like. The message may be displayed in a web browser or other application on the other computing device and the user may use the camera of the computing device 102 to scan or take a picture of the message. Other options may include communicating the message to computing device 102 or another computing device using electronic mail or other message services, such as Teams® or Slack®.

At line 306, the computing device 102 may process the message, including the embedded link. For example, the user may select or interact with the embedded link, and the operating system 212 may process the selection and launch an application store or web browser to download the application. The operating system 212 may further download the application through the store or browser and install the application to execute on the computing device 102. In some instances, once the application is installed, the application may communicate back to system 104 an indication that it's installed. The indication may be communicated through an API and include information to specifically identify computing device 102, e.g., a phone number, device identifier, etc. In other instances, the user may verbally or through text-based chat communicate to the operator of system 104 that the application is successfully installed.

At line 308, the system 104 may determine a task identifier to identify an authentication task or operation to be performed by the application. In one example, the system 104 may perform a lookup in a database to determine the task identifier to identify the authentication operation to the application. The task identifier may be a combination of alphanumeric values that uniquely identifies the authentication operation. In some instances, the task identifier may be a programmed variable for a function of the application. The function may be invoked, and the task identifier may be passed to the function as an element. The function may process the task identifier and perform the authentication operation.

At line 310, the system 104 may communicate the task identifier to the computing device 102. In one example, the system 104 may generate a second text message or QR code with an embedded link. The embedded link includes a link to launch the mobile application on the computing device 102 and the task identifier. The task identifier is passed to the application when the application is launched. As similarly discussed above, the user may select the embedded link to cause the application to launch. In other instances, the application may automatically launch when the text message is received.

In some instances, the task identifier may be passed directly to the application on the computing device 102. For example, the application may execute on the computing device 102 and determine that the user is not authenticated to perform operations with the application. The application may communicate to the system 104 through an API, an indication that the authentication operation needs to occur. The system 104 may communicate the task identifier to the computing device 102 through another API call.

Figure 9:
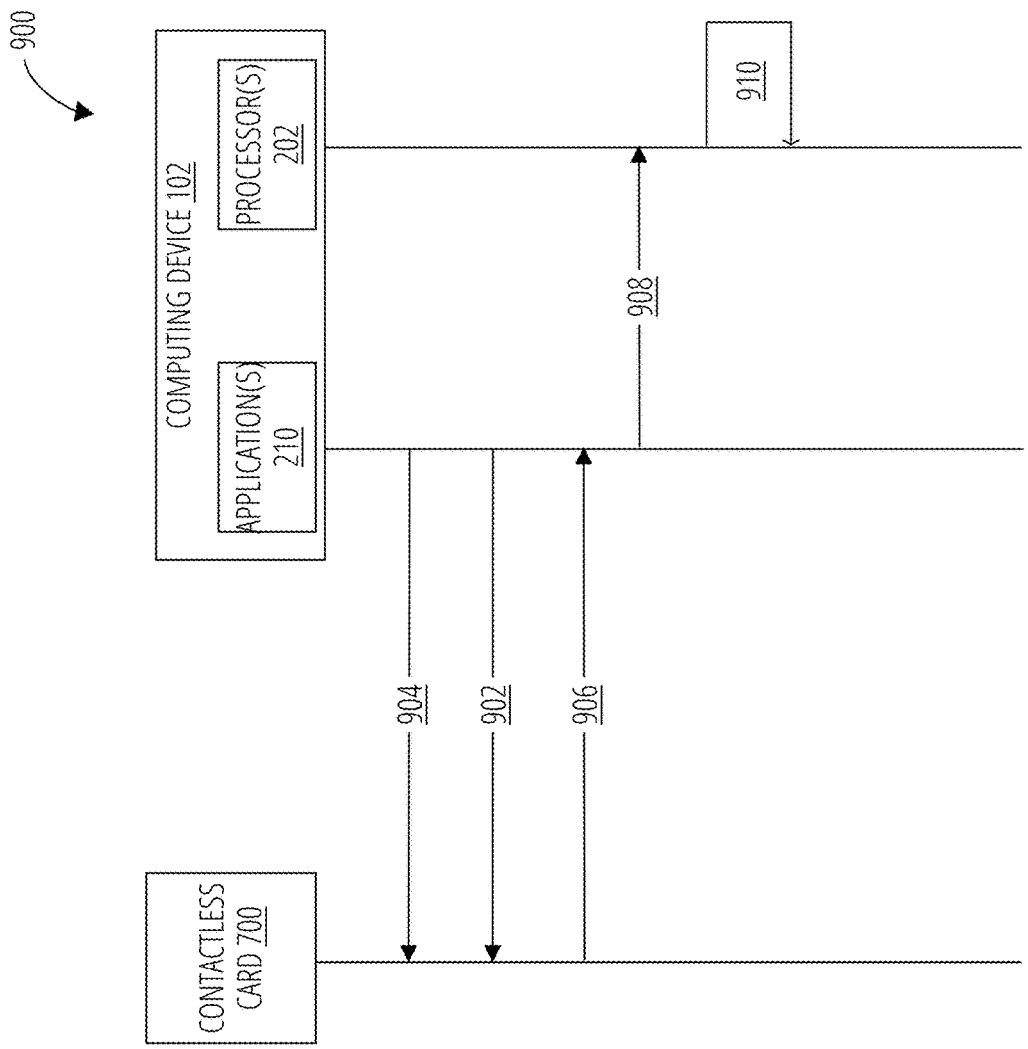
FIG. 9 illustrates a sequence flow 900 in accordance with one embodiment.
Figure 11:
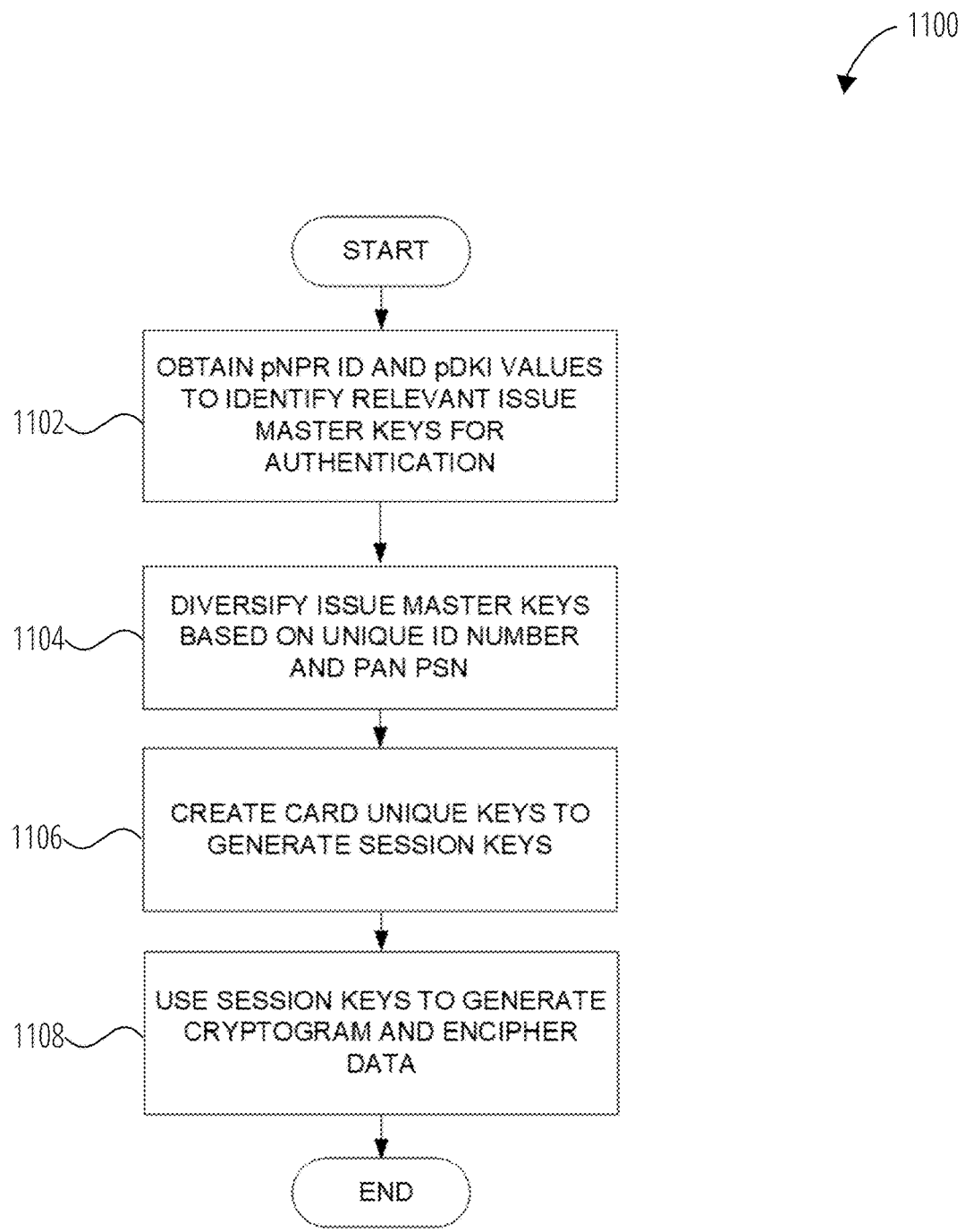
FIG. 11 is a flowchart of a method 1100 of generating a cryptogram according to an example embodiment.

At line 312, the computing device 102 may process the task identifier and perform the operation associated with the task identifier. Specifically, the application will initiate the operation (e.g., authentication operation) based on the task identifier on the computing device 102. The authentication operation includes the user providing a token or identifying information to the computing device 102. The computing device 102, including the application, will perform the authentication by communicating the information to system 104 or another authentication server to compare the information to trusted information. In one example, the user can provide a token on their contactless card 700 to the computing device 102, which may be forwarded to system 104 or another server to authenticate. The method 1100 of FIG. 11 illustrates one possible processing flow that may be performed by the contactless card 700 to generate a cryptogram including the token. FIG. 9 illustrates a sequence flow 900 where the cryptogram is communicated from the contactless card 700 to the computing device 102. In another example, the user may take a picture of a trusted identification (e.g., driver's license), and the picture may be authenticated. Other authentication methods may include authenticating a biometric sample, a trusted certificate, etc.

In the illustrated example, the computing device 102 may communicate authentication information to the system 104 at line 314 to perform as part of the authentication operation. As mentioned, the authentication information may include a cryptogram from a contactless card 700, a picture of a trusted identification, or other trusted information (biometric sample). The authentication information may be communicated to the system 104 via the application and through an API. The API may provide a secure and encrypted channel to communicate the data to the system 104.

Figure 12:
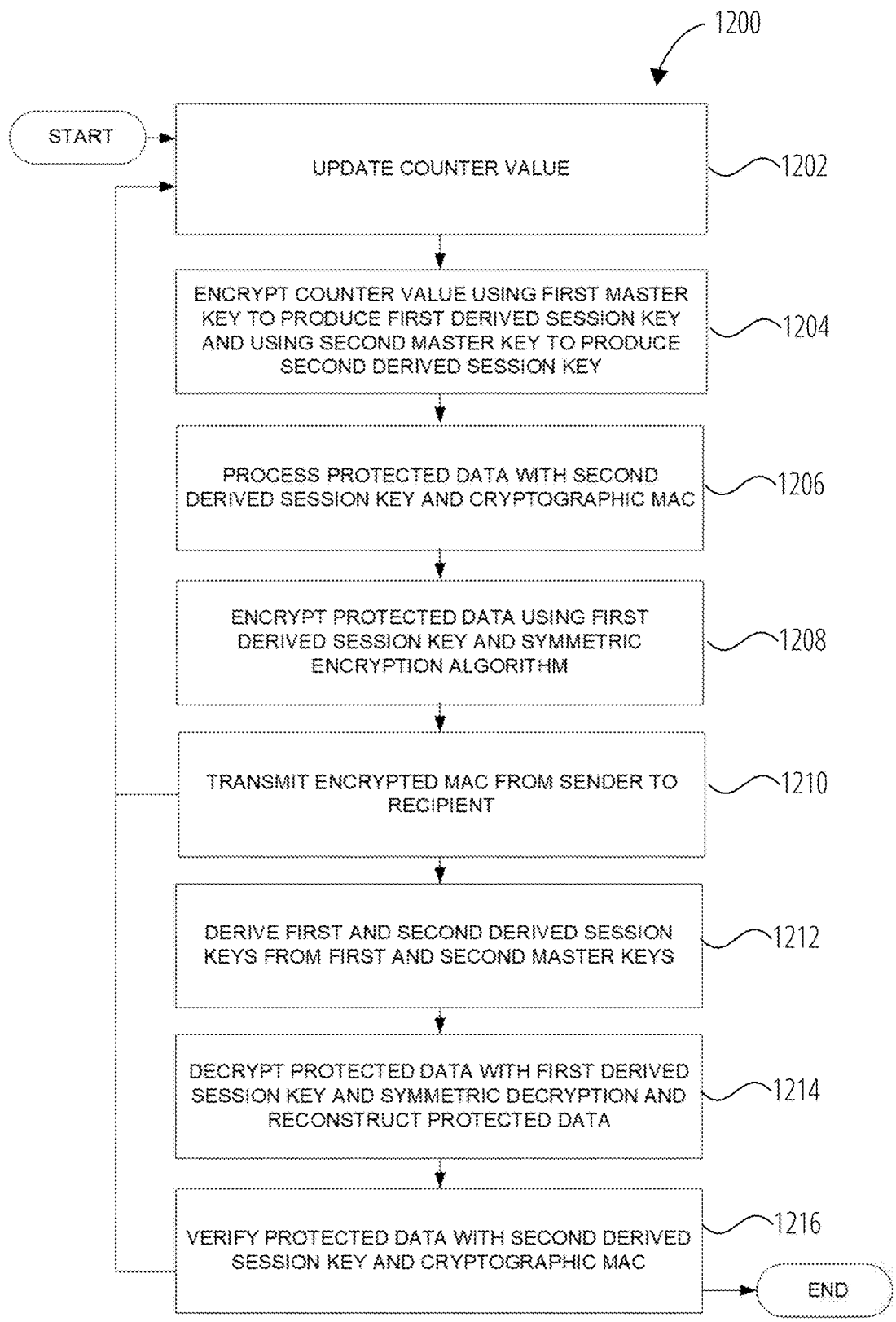
FIG. 12 illustrates a flowchart of a method 1200 in accordance with embodiments.

At line 316, the system 104 performs authentication on the information from the computing device 102. For example, the system 104 may verify that the authentication information is accurate or correct based on a comparison with stored trusted information. If the authentication information matches the trusted information, the user is authenticated. If the authentication information does not match the trusted information, the user is not authenticated. FIG. 12 describes one possible method 1200 that may be performed to authenticate a user utilize a contactless card 700 and a server, e.g., system 104.

At line 318, the system 104 communicates a result of the authentication to the computing device 102. The result includes an indication as to whether the user is successfully authenticated or not authenticated. At line 320, the system 104 may enable or prevent the user from performing the sensitive task. For example, the system 104 may set a flag or an indication for the application of the computing device 102 to permit or deny the user to perform the sensitive task. The indication may be an API call or communication to the application.

Figure 4:
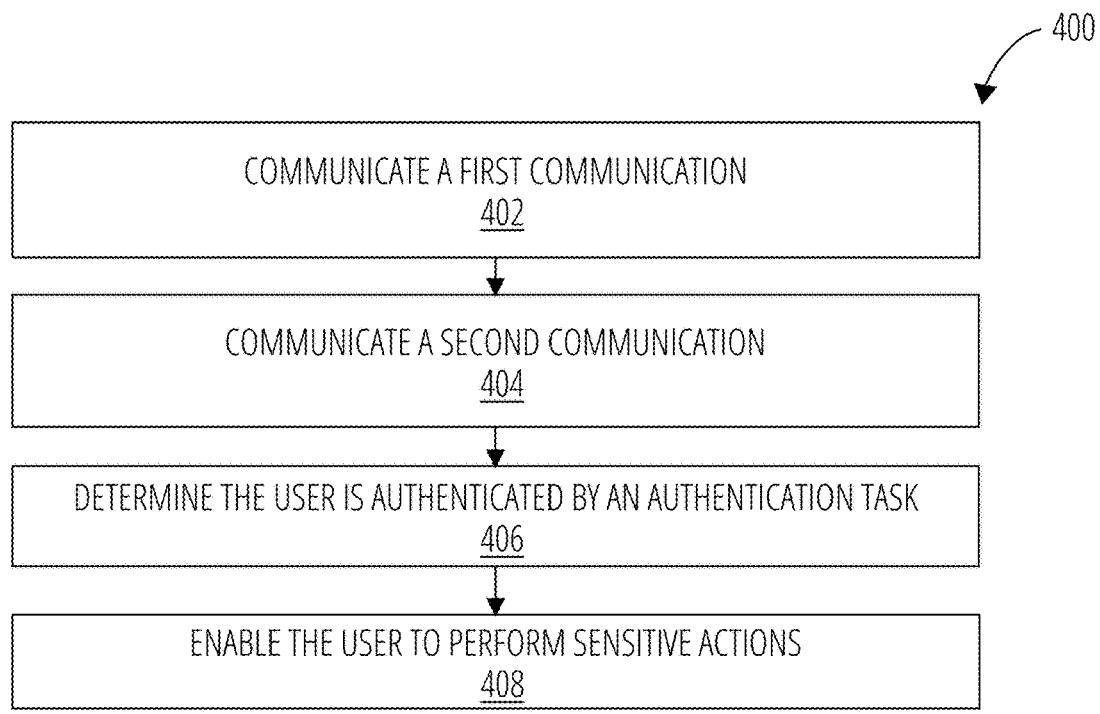
FIG. 4 illustrates a routine 400 in accordance with one embodiment.

FIG. 4 illustrates an example routine 400 that may be performed by a system, such as 104, to authenticate a user to perform sensitive actions. The operations discussed herein may be performed by software, hardware, or combination thereof.

In block 402, the routine 400 includes communicating the first communication to a mobile device. The first communication includes first data to cause the mobile device to download a mobile application. In embodiments, the first communication may be a text message or a QR code and the first data may be an embedded link, such as a Hypertext Transfer Protocol (HTTP) or HTTP secure (HTTPS) link that, when activated, causes the mobile device to go to a location to download a mobile application.

In block 404, the routine 400 includes communicating a second communication to the mobile device. The second communication includes second data comprising a task identifier, and the second data to cause the mobile application to perform an authentication task associated with the task identifier. In embodiments, the second communication may also be a text message or QR code, and the second data may be an embedded link to launch the downloaded mobile application. The task identifier may be processed by the mobile application to execute an authentication task to authenticate a user of the mobile device.

In block 406, the routine 400 includes determining the user is authenticated by the authentication task. In embodiments, the mobile device, an authentication server, the system 104, or a combination thereof may perform the authentication task. One or more of the mobile device, the authentication server, and the system 104 may provide an indication of the result of the authentication task (e.g., authenticated or unauthenticated).

In block 408, the routine 400 includes enabling the user to perform sensitive actions via the mobile device. For example, the system may set a flag or setting to permit or deny the user from performing the sensitive actions. If the user is authenticated, the system may set a setting to permit the user to perform the sensitive actions, or vice versa.

Figure 5:
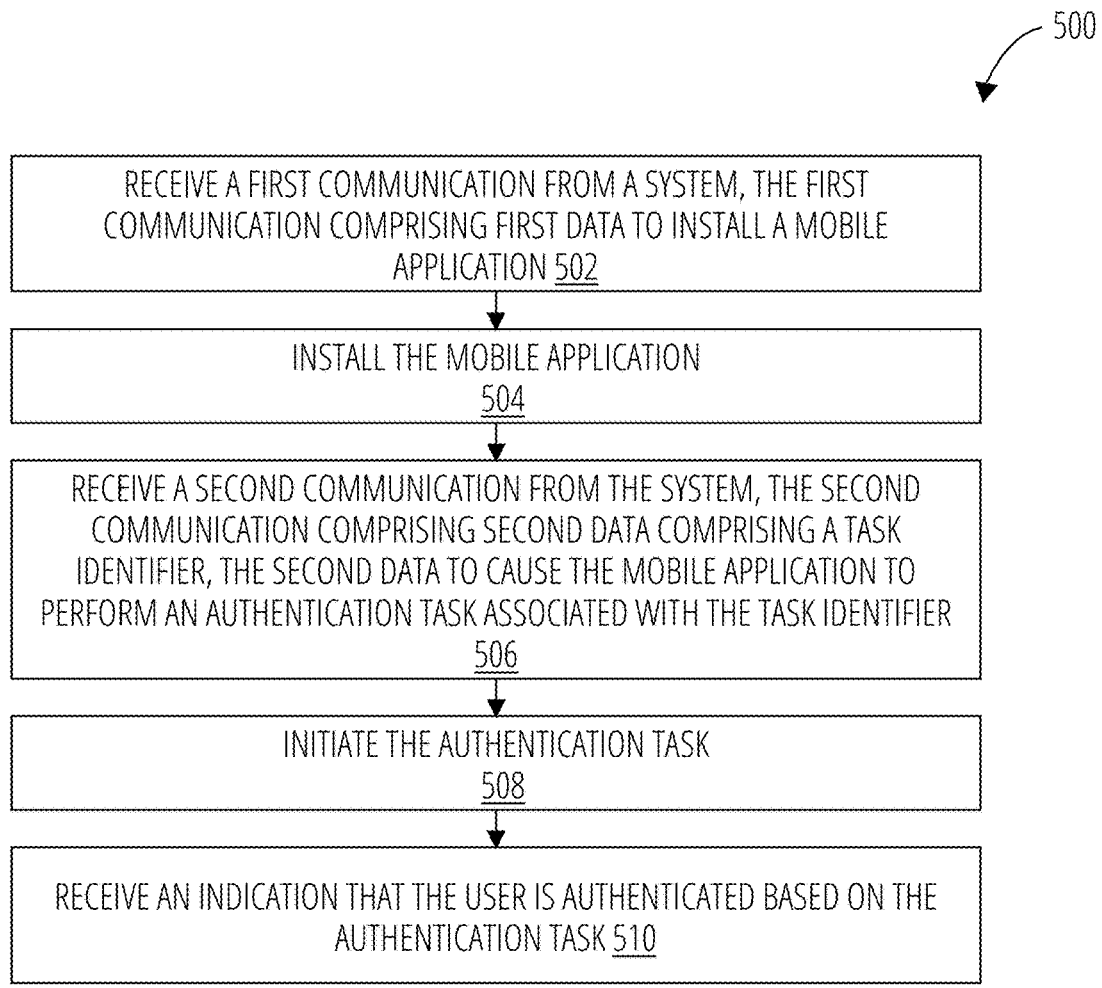
FIG. 5 illustrates a routine 500 in accordance with one embodiment.

FIG. 5 illustrates an example routine 500 that may be performed by a mobile device, such as computing device 102, to authenticate a user to perform sensitive actions. The operations discussed herein may be performed by software, hardware, or combination thereof.

In block 502, the routine 500 includes receiving a first communication from a system to authenticate a user. In embodiments, the first communication may be generated and communicated by the system based on a determination the mobile device does not have the mobile application to perform the authentication task. The mobile application may be a trusted application provided by the service provider associated with and controlling the system. In embodiments, the first communication includes the first data to install the mobile application. As previously discussed, the first communication may be a text message or a QR code, and the first data may be an embedded link, that when activated, downloads and installs the application on the mobile device.

In block 504, the routine 500 includes installing the mobile application based on the invocation of the first data. For example, a user of the mobile device may select the link via an interface, such as a touchscreen, and the operating system may be redirected to execute and open the application store to download the application. The link may cause the store to open to the location to directly download the application. In some instances, the first communication, including the first data may cause the operating system to redirect to the application store and install the application automatically when the communication is received. For example, the operating system may automatically process the link upon reception without the user selecting.

In block 506, the routine 500 includes receiving a second communication from the system. In embodiments, the second communication includes the second data comprising a task identifier, and the second data may cause the mobile application to perform an authentication task associated with the task identifier. The second communication may also be a text message or QR code, and the second data may also be an embedded link. However, this embedded link may include data to cause the newly downloaded application to execute when it is selected or invoked. Again, this link may also execute based on a user selection or automatically upon reception of the message. The link may also include a task identifier to identify the authentication task that is required to be performed by the application. The identifier may be passed to the application when the link is selected or invoked. The application may initiate and process the task identifier.

In block 508, the routine 500 includes initiating the authentication task based on the invocation of the second data to determine the user is authenticated. For example, the mobile application utilizes the task identifier to identify instructions to perform the authentication task. The instructions may execute by the mobile device, which may cause the mobile device to perform authentication with one or more of an authentication server or system 104.

In block 510, the routine 500 includes receiving an indication that the user is authenticated based on the performance of the authentication task. For example, the mobile device may receive an indication from an authentication server or system 104 indicating that information sent to the server or system is authenticated and the user is authenticated. In embodiments, the indication may also indicate that the user capable of performing sensitive actions with the mobile application. The user may now perform the action they desired to perform with the mobile application.

Figure 6A:
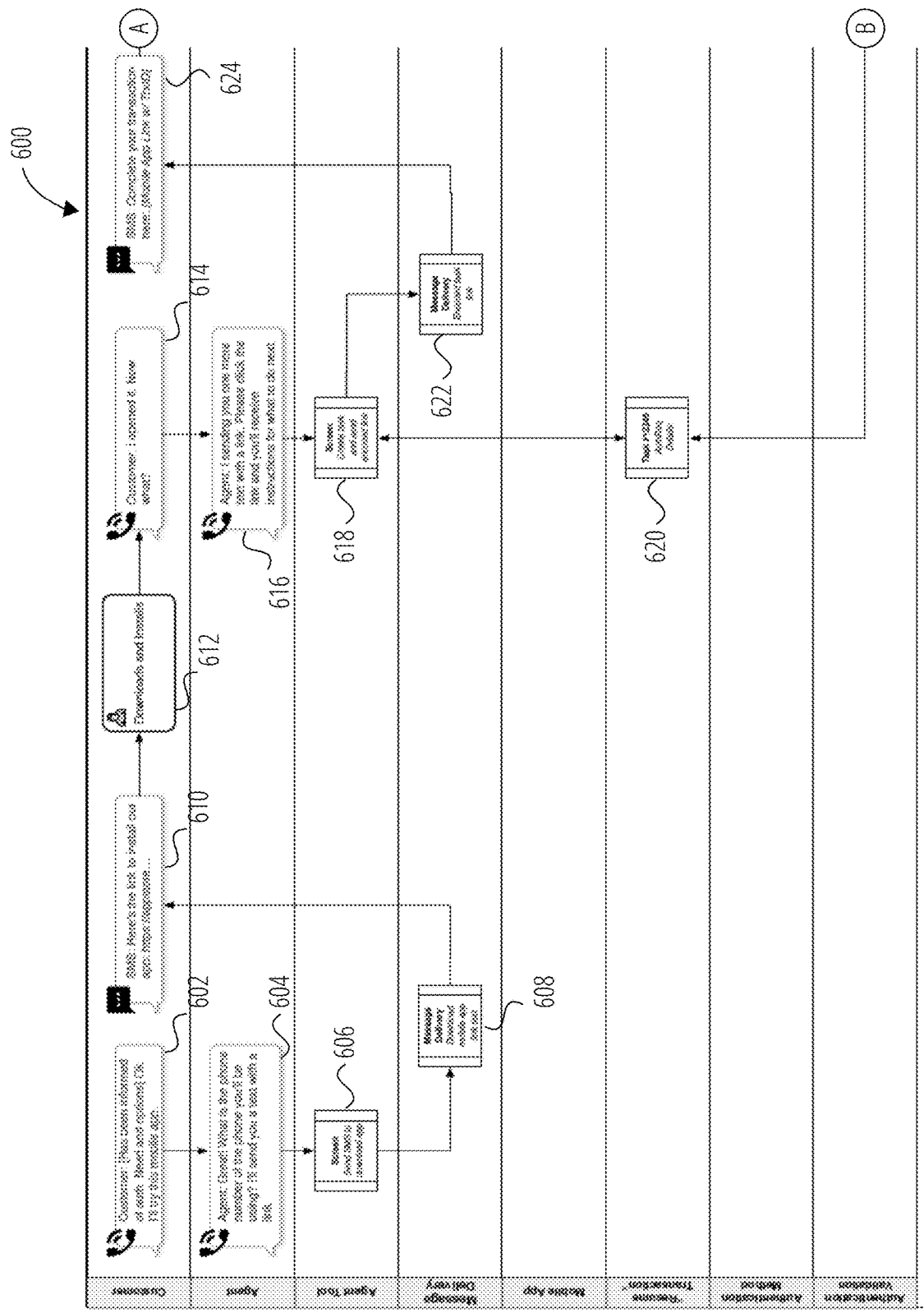
FIG. 6A illustrates an example of a sequence flow 600 in accordance with one embodiment.

FIG. 6A illustrates an example sequence flow 600 that may occur between a user and a customer service operator to authenticate a user such that they can perform sensitive in accordance with embodiments discussed herein. The items discussed in this sequence flow 600 may be performed by systems and devices discussed herein, including computing device 102 (e.g., mobile device) and system 104 (e.g., a banking system).

In the illustrated example, the customer may make a telephone to a service provider, such as a bank. The customer may want to perform a high-risk task using the service provider, but the customer is not authenticated with the service provider, e.g., the customer is not enrolled with a single sign-on username and password. At 602, the customer may be notified that they are not authenticated to perform the high-risk task but can easily and quickly perform an authentication operation using a mobile application on a mobile device. At 604, the agent or operator communicates with the customer to obtain a phone number associated with the customer's phone to send a text message. The customer may verbally provide the number to the agent.

At 606, the agent may provide the phone number to a system (e.g., through a GUI) to send the text message to download the application to the customer's mobile phone. The system may generate a text message. The text message includes an embedded link (e.g., https://appstore/app). to download the application. At 608, the text message is communicated to the mobile device associated with the phone number. And at 610, the customer receives the text message on their mobile device. At 612, the customer may invoke or select the link in the message, and the message redirects the mobile device to download the application. At 612, the mobile application is downloaded on the mobile device.

At 614, the customer may communicate an indication that the mobile application is installed on the mobile device and is open. Further and at 616, the agent may confirm with the customer that the mobile application is installed on the mobile device and notify the customer that they are going to send another message. At 618, the agent may interact with a GUI interface to generate another message to communicate to the customer's mobile device. The system may create a task to perform on the mobile device. At 620, the system may determine a task identifier associated with the task. The task identifier may identify the task to the application and the system. The task identifier and link may be embedded in a message and sent to the mobile device at 622. And at block 624, the mobile device may receive the message from the system, including a link to cause the mobile application to execute or initiate with the task identifier.

Figure 6B:
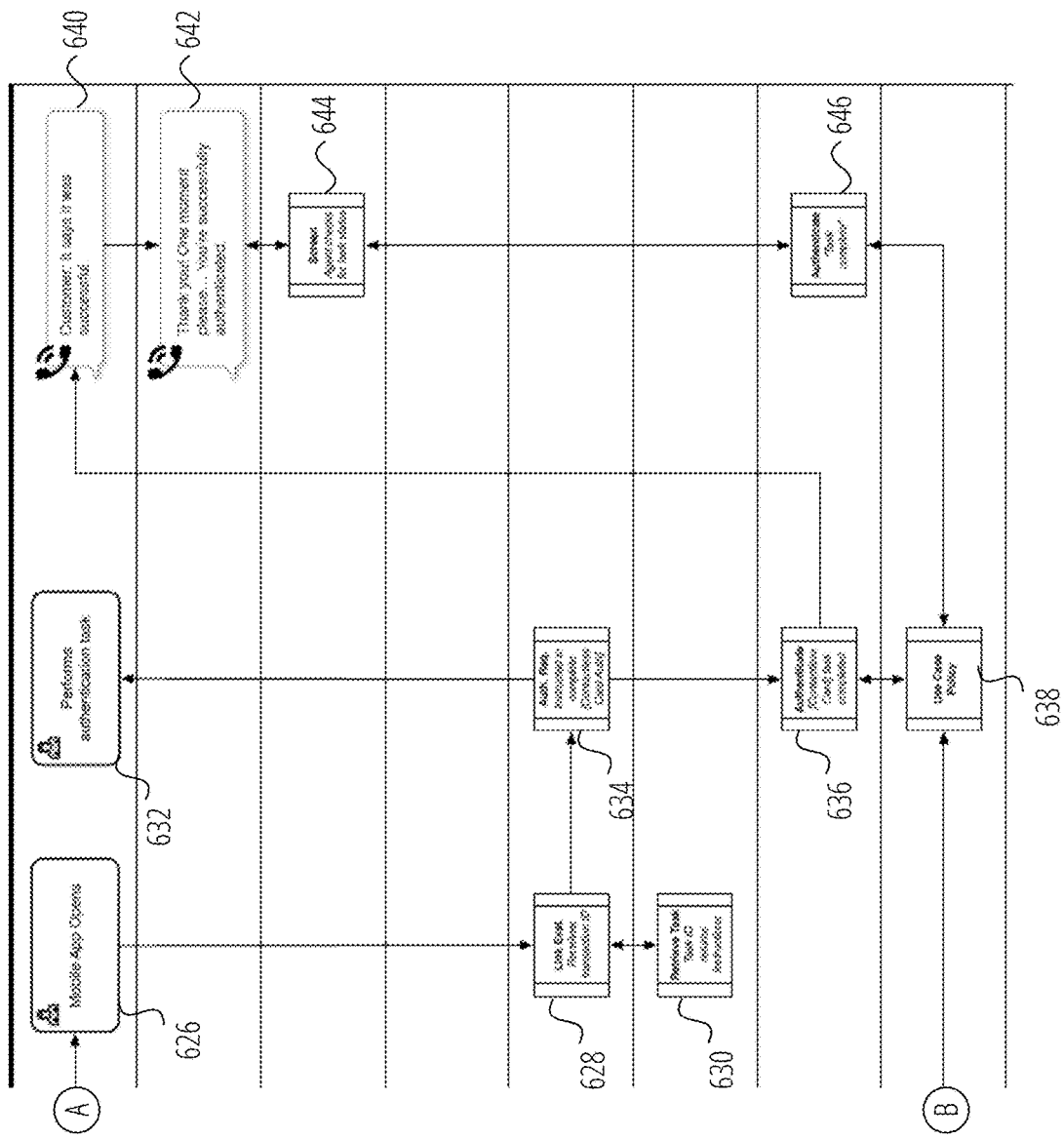
FIG. 6B illustrates a continuation of the sequence flow 600 in accordance with one embodiment.

In FIG. 6B, the sequence flow 600 continues; and at 626, the mobile application may initiate and execute on the customer's mobile device. In some instances, the customer may select the link to cause the mobile application to execute. In other instances, the mobile application may execute upon reception of the text message. The mobile application may open on the mobile device and present a GUI for the customer to interact with the application.

At 628, the mobile application evaluates the task identifier embedded in the link and/or provided in the text message. The mobile application may determine the task associated with the task identifier (e.g., perform the authentication operation). At 630, the mobile application may process the task identifier. For example, the mobile application may execute a function with the task identifier to cause the instructions associated with performing the authentication to execute on the mobile device.

At 634, the mobile application may execute and perform the task (e.g., the authentication operation). In the illustrated example, the customer has a contactless card associated with the service provider and can be authenticated based on the information on the contactless card. To perform authentication via the contactless card, the mobile device may retrieve the information from the card and send the information to a system to perform authentication with the contactless card information. At 632, the customer may be instructed to bring the card within a communication range of the mobile device. In one example, the customer may receive instructions, via a GUI display, to tap the contactless card on the mobile device, ensuring that the card is within a short-range communication range of the mobile device. At 634, the mobile device may process the contactless card information by sending the information to the server to perform the authentication and receiving a result of the authentication performed. At 636, the mobile device may confirm that the authentication was successful.

At 638, a use case policy analysis may be performed and applied to the task to determine a type of authentication that is available for the user. This process may be performed by the mobile application prior to the authentication operation. In one example, the use case policy may be applied to information of the user and determine that the user has a contactless card for authentication. In another example, the use case policy may determine that the customer does not have a contactless card and an alternative method needs to be used to authenticate the user. In some instances, the user may have more than one authentication method available to use for authentication (e.g., contactless card, biometric, identification), and the use case policy may assign different authenticate methods based on the risk level of the task to be performed by the user. For example, higher-risk tasks may require a stronger authentication method than lower-risk tasks. The authentication methods may be ranked from strongest to weakest, for example.

In embodiments, the authentication operation may be performed and provide a result to the customer and the mobile device. At 640, the customer may communicate to the agent that the authentication operation is successful. In some instances, at 646, the agent may receive an indication from the mobile application and mobile device confirming that the authentication is successful. The status may be provided in a GUI display at 644, and the agent my confirm to the customer that they are authenticated at 642.

Figure 7:
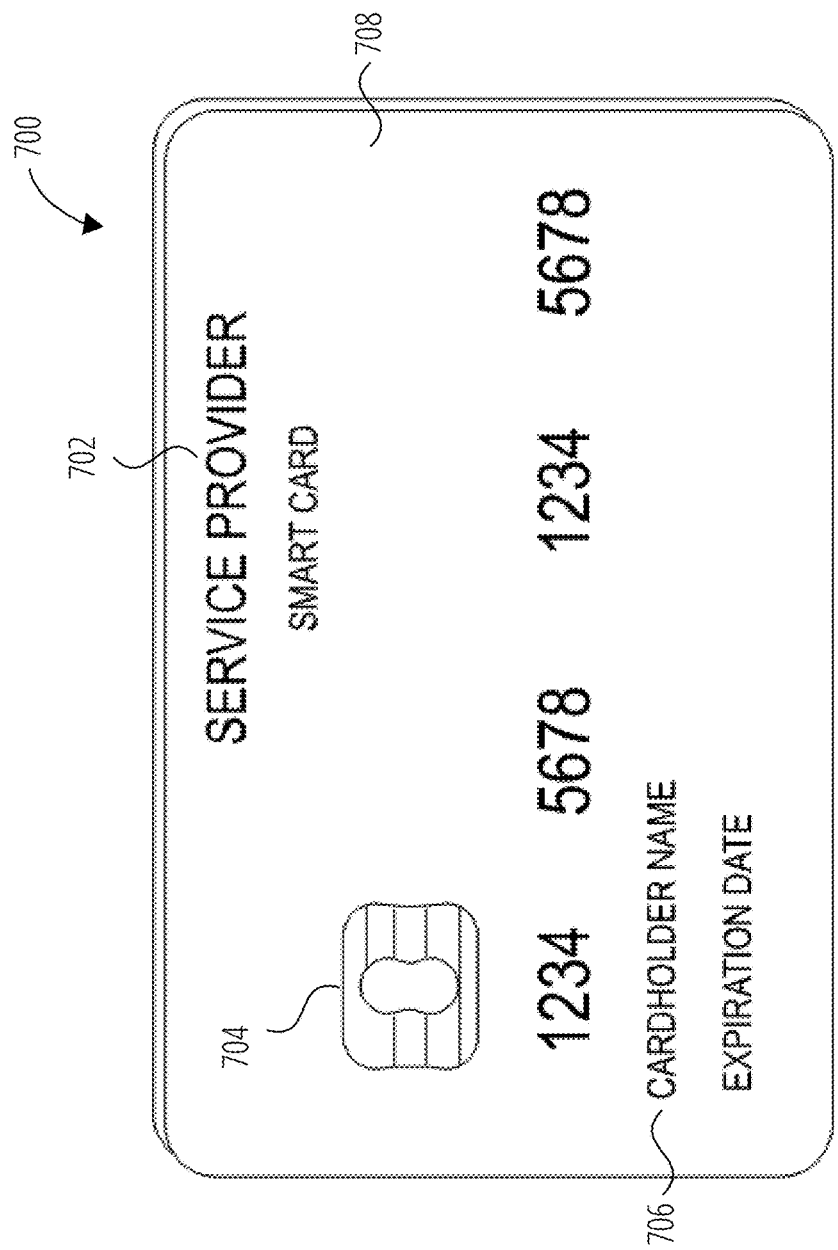
FIG. 7 illustrates a contactless card 700 in accordance with one embodiment.

FIG. 7 illustrates an example configuration of a contactless card 700, which may include a contactless card, a payment card, such as a credit card, debit card, or gift card, issued by a service provider as displayed as service provider indicia 702 on the front or back of the contactless card 700. In some examples, the contactless card 700 is not related to a payment card and may include, without limitation, an identification card. In some examples, the transaction card may include a dual interface contactless payment card, a rewards card, and so forth. The contactless card 700 may include a substrate 708, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 700 may have physical characteristics compliant with the ID-1 format of the ISO/IEC 7816 standard, and the transaction card may otherwise be compliant with the ISO/IEC 14443 standard. However, it is understood that the contactless card 700, according to the present disclosure, may have different characteristics, and the present disclosure does not require a transaction card to be implemented in a payment card.

Figure 8:
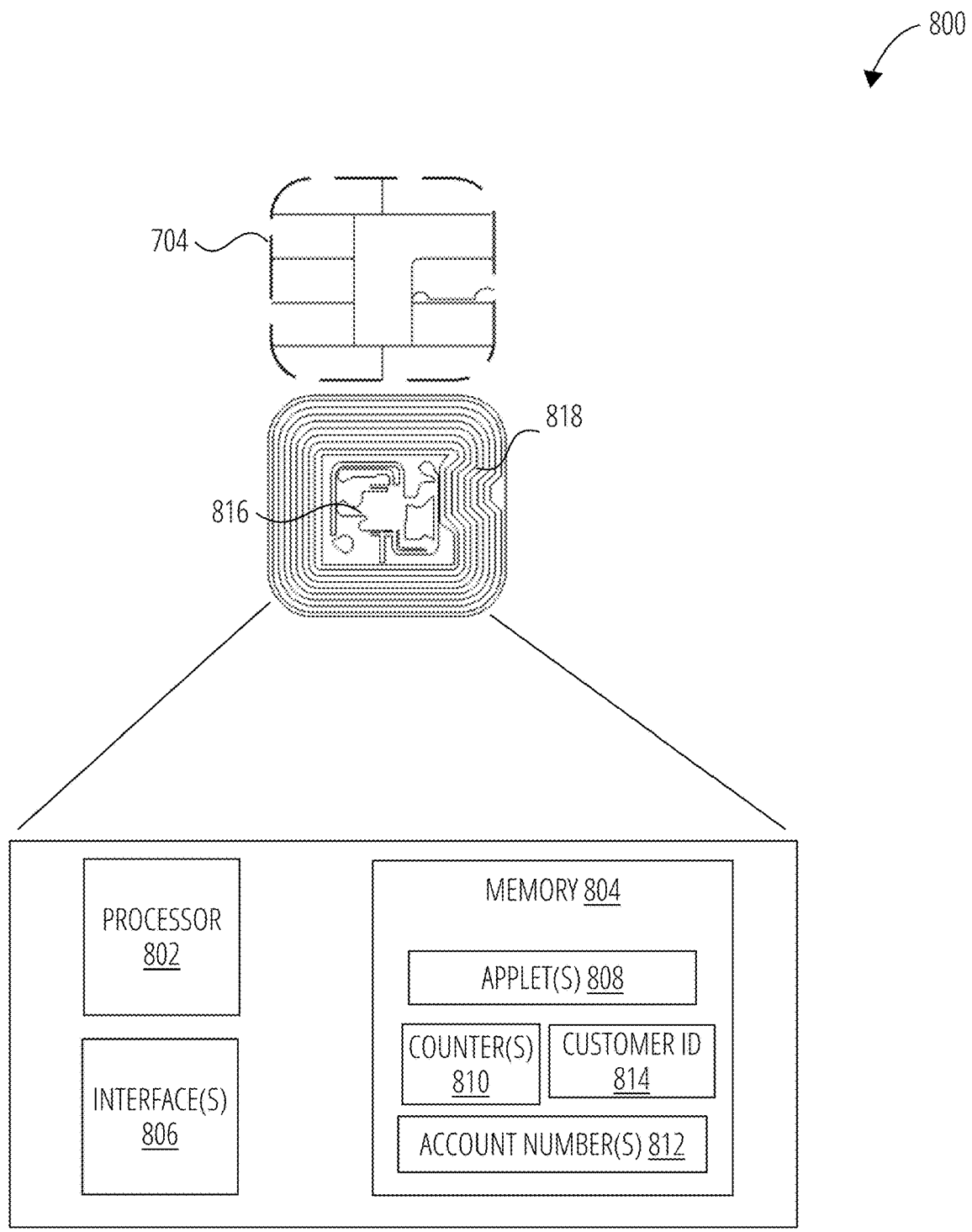
FIG. 8 illustrates a transaction card component 800 in accordance with one embodiment.

The contactless card 700 may also include identification information 706 displayed on the front and/or back of the card, and a contact pad 704. The contact pad 704 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 700 may also include processing circuitry, antenna and other components as will be further discussed in FIG. 8. These components may be located behind the contact pad 704 or elsewhere on the substrate 708, e.g. within a different layer of the substrate 708, and may electrically and physically coupled with the contact pad 704. The contactless card 700 may also include a magnetic strip or tape, which may be located on the back of the card (not shown in FIG. 7). The contactless card 700 may also include a Near-Field Communication (NFC) device coupled with an antenna capable of communicating via the NFC protocol. Embodiments are not limited in this manner.

As illustrated in FIG. 7, the contact pad 704 of contactless card 700 may include processing circuitry 816 for storing, processing, and communicating information, including a processor 802, a memory 804, and one or more interface(s) 806. It is understood that the processing circuitry 816 may contain additional components, including processors, memories, error and parity/CRC checkers, data encoders, anticollision algorithms, controllers, command decoders, security primitives and tamper-proofing hardware, as necessary to perform the functions described herein.

The memory 804 may be a read-only memory, write-once read-multiple memory or read/write memory, e.g., RAM, ROM, and EEPROM, and the contactless card 700 may include one or more of these memories. A read-only memory may be factory programmable as read-only or one-time programmable. One-time programmability provides the opportunity to write once then read many times. A write-once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 804 may be encrypted memory utilizing an encryption algorithm executed by the processor 802 to encrypted data.

The memory 804 may be configured to store one or more applet(s) 808, one or more counter(s) 810, a customer identifier 814, and the account number(s) 812, which may be virtual account numbers. The one or more applet(s) 808 may comprise one or more software applications configured to execute on one or more contactless cards, such as a Java® Card applet. However, it is understood that applet(s) 808 are not limited to Java Card applets and instead may be any software application operable on contactless cards or other devices having limited memory. The one or more counter(s) 810 may comprise a numeric counter sufficient to store an integer. The customer identifier 814 may comprise a unique alphanumeric identifier assigned to a user of the contactless card 700, and the identifier may distinguish the user of the contactless card from other contactless card users. In some examples, the customer identifier 814 may identify both a customer and an account assigned to that customer and may further identify the contactless card 700 associated with the customer's account. As stated, the account number(s) 812 may include thousands of one-time use virtual account numbers associated with the contactless card 700. An applet(s) 808 of the contactless card 700 may be configured to manage the account number(s) 812 (e.g., to select an account number(s) 812, mark the selected account number(s) 812 as used, and transmit the account number(s) 812 to a mobile device for auto filling by an auto filling service.

The processor 802 and memory elements of the foregoing exemplary embodiments are described with reference to the contact pad 704, but the present disclosure is not limited thereto. It is understood that these elements may be implemented outside of the contact pad 704 or entirely separate from it or as further elements in addition to processor 802 and memory 804 elements located within the contact pad 704.

In some examples, the contactless card 700 may comprise one or more antenna(s) 818. The one or more antenna(s) 818 may be placed within the contactless card 700 and around the processing circuitry 816 of the contact pad 704. For example, the one or more antenna(s) 818 may be integral with the processing circuitry 816 and one or more antenna(s) 818 may be used with an external booster coil. As another example, one or more antenna(s) 818 may be external to the contact pad 704 and the processing circuitry 816.

In an embodiment, the coil of contactless card 700 may act as the secondary of an air-core transformer. The terminal may communicate with the contactless card 700 by cutting power or amplitude modulation. The contactless card 101 may infer the data transmitted from the terminal using the gaps in the contactless card's power connection, which may be functionally maintained through one or more capacitors. The contactless card 700 may communicate back by switching a load on the contactless card's coil or load modulation. Load modulation may be detected in the terminal's coil through interference. More generally, using the antenna(s) 818, processor 802, and/or the memory 804, the contactless card 101 provides a communications interface to communicate via NFC, Bluetooth, and/or Wi-Fi communications.

As explained above, contactless card 700 may be built on a software platform operable on smart cards or other devices having limited memory, such as JavaCard, and one or more or more applications or applets may be securely executed. Applet(s) 808 may be added to contactless cards to provide a one-time password (OTP) for multifactor authentication (MFA) in various mobile application-based use cases. Applet(s) 808 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 808 may be configured to encode the OTP as an NDEF type 4 well-known type text tag. In some examples, NDEF messages may comprise one or more records. The applet(s) 808 may be configured to add one or more static tag records in addition to the OTP record.

In some examples, one or more applet(s) 808 may be configured to emulate an RFID tag. The RFID tag may include one or more polymorphic tags. In some examples, each time the tag is read, different cryptographic data is presented that may indicate the authenticity of the contactless card. Based on the one or more applet(s) 808, an NFC read of the tag may be processed, the data may be transmitted to a server, such as a server of a banking system, and the data may be validated at the server.

In some examples, the contactless card 700 and server may include certain data such that the card may be properly identified. The contactless card 700 may include one or more unique identifiers (not pictured). Each time a read operation takes place, the counter(s) 810 may be configured to increment. In some examples, each time data from the contactless card 700 is read (e.g., by a mobile device), the counter(s) 810 is transmitted to the server for validation and determines whether the counter(s) 810 are equal (as part of the validation) to a counter of the server.

One or more counter(s) 810 may be configured to prevent a replay attack. For example, if a cryptogram has been obtained and replayed, that cryptogram is immediately rejected if the counter(s) 810 has been read or used or otherwise passed over. If the counter(s) 810 has not been used, it may be replayed. In some examples, the counter that is incremented on the card is different from the counter that is incremented for transactions. The contactless card 101 is unable to determine the application transaction counter(s) 810 since there is no communication between applet(s) 808 on the contactless card 700.

In some examples, the counter(s) 810 may get out of sync. In some examples, to account for accidental reads that initiate transactions, such as reading at an angle, the counter(s) 810 may increment, but the application does not process the counter(s) 810. In some examples, when the mobile device is woken up, NFC may be enabled, and the device 110 may be configured to read available tags, but no action is taken responsive to the reads.

To keep the counter(s) 810 in sync, an application, such as a background application, may be executed that would be configured to detect when the mobile device 110 wakes up and synchronize with the server of a banking system indicating that a read that occurred due to detection to then move the counter(s) 810 forward. In other examples, Hashed One Time Password may be utilized such that a window of mis-synchronization may be accepted. For example, if within a threshold of 10, the counter(s) 810 may be configured to move forward. But if within a different threshold number, a request for performing re-synchronization may be processed which requests via one or more applications that the user tap, gesture, or otherwise indicate one or more times via the user's device. If the counter(s) 810 increases in the appropriate sequence, then it possible to know that the user has done so.

The key diversification technique described herein with reference to the counter(s) 810, master key, and diversified key is one example of encryption and/or decryption a key diversification technique. This example key diversification technique should not be considered limiting of the disclosure, as the disclosure is equally applicable to other types of key diversification techniques.

During the creation process of the contactless card 700, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 700. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique and assigned either by personalization or algorithmically assigned by some identifying information. For example, odd-numbered cards may increment by 2, and even-numbered cards may increment by 5. In some examples, the increment may also vary in sequential reads, such that one card may increment in sequence by 1, 3, 5, 2, 2, . . . repeating. The specific sequence or algorithmic sequence may be defined at personalization time or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

FIG. 9 is a timing diagram illustrating an example sequence for providing authenticated access according to one or more embodiments of the present disclosure. Sequence flow 900 may include contactless card 700 and computing device 102, which may include an application(s) 210 and processor(s) 202.

At line 904, the application(s) 210 communicates with the contactless card 700 (e.g., after being brought near the contactless card 700). Communication between the application(s) 210 and the contactless card 700 may involve the contactless card 700 being sufficiently close to a card reader (not shown) of the computing device 102 to enable NFC data transfer between the application(s) 210 and the contactless card 700.

At line 902, after communication has been established between computing device 102 and contactless card 700, contactless card 700 generates a message authentication code (MAC) cryptogram. In some examples, this may occur when the contactless card 700 is read by the application(s) 210. In particular, this may occur upon a read, such as an NFC read, of a near field data exchange (NDEF) tag, which may be created in accordance with the NFC Data Exchange Format. For example, a reader application, such as application(s) 210, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 700 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string). In some examples, application(s) 210 may be configured to transmit a request to contactless card 700, the request comprising an instruction to generate a MAC cryptogram.

At line 906, the contactless card 700 sends the MAC cryptogram to the application(s) 210. In some examples, the transmission of the MAC cryptogram occurs via NFC; however, the present disclosure is not limited thereto. In other examples, this communication may occur via Bluetooth, Wi-Fi, or other means of wireless data communication. At line 908, the application(s) 210 communicates the MAC cryptogram to the processor(s) 202.

At line 910, the processor(s) 202 verifies the MAC cryptogram pursuant to an instruction from the application 122. For example, the MAC cryptogram may be verified, as explained below. In some examples, verifying the MAC cryptogram may be performed by a device other than computing device 102, such as a server of a banking system in data communication with the computing device 102. For example, processor(s) 202 may output the MAC cryptogram for transmission to the server of the banking system, which may verify the MAC cryptogram. In some examples, the MAC cryptogram may function as a digital signature for purposes of verification and authentication. Other digital signature algorithms, such as public key asymmetric algorithms, e.g., the Digital Signature Algorithm and the RSA algorithm, or zero knowledge protocols, may be used to perform this verification.

Figure 10:
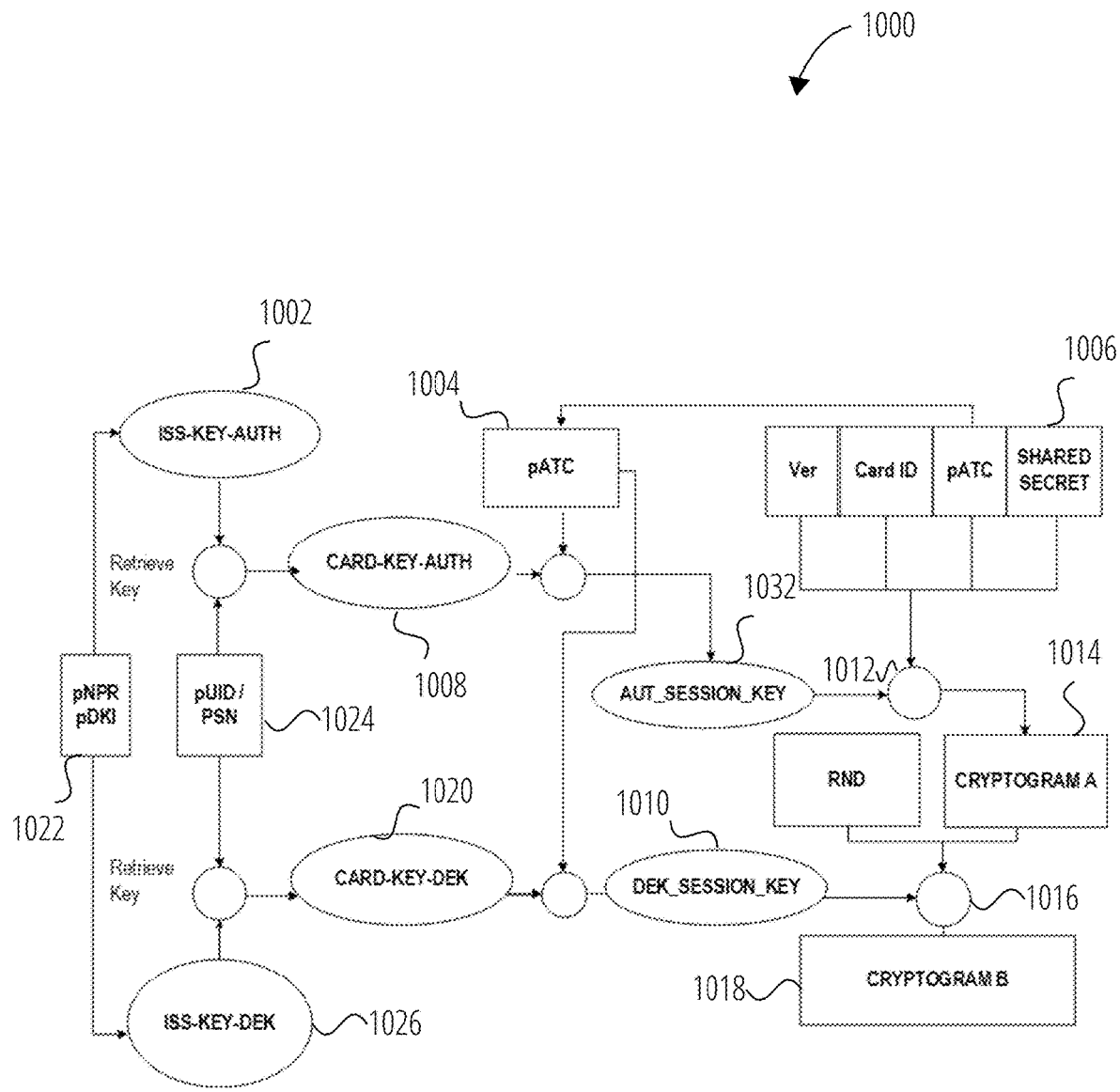
FIG. 10 is a diagram of a key system 1000 according to an example embodiment.

FIG. 10 illustrates a diagram of a system 1000 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1002, 1026 may be required for each part of the portfolio on which the one or more applets is issued. For example, the first master key 1002 may comprise an Issuer Cryptogram Generation/Authentication Key (Iss-Key-Auth) and the second master key 1026 may comprise an Issuer Data Encryption Key (Iss-Key-DEK). As further explained herein, two issuer master keys 1002, 1026 are diversified into card master keys 1008, 1020, which are unique for each card. In some examples, a network profile record ID (pNPR) 522 and derivation key index (pDKI) 1024, as back office data, may be used to identify which Issuer Master Keys 1002, 1026 to use in the cryptographic processes for authentication. The system performing the authentication may be configured to retrieve values of pNPR 1022 and pDKI 1024 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1008 and Card-Key-Dek 1020). The session keys (Aut-Session-Key 1032 and DEK-Session-Key 1010) may be generated by the one or more applets and derived by using the application transaction counter (pATC) 1004 with one or more algorithms. To fit data into the one or more algorithms, only the 2 low order bytes of the 4-byte pATC 1004 is used. In some examples, the four byte session key derivation method may comprise: F1:=PATC(lower 2 bytes) ||'F0'||'00'||PATC (four bytes) F1:=PATC(lower 2 bytes) ||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 1004 counter. At each tap of the contactless card, pATC 1004 is configured to be updated, and the card master keys Card-Key-AUTH 808 and Card-Key-DEK 1020 are further diversified into the session keys Aut-Session-Key 1032 and DEK-Session-KEY 1010. pATC 1004 may be initialized to zero at personalization or applet initialization time. In some examples, the pATC counter may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1032. The data specified in cryptogram may be processed with javacard.signature method: ALG_DES_MAC8_ISO9797_1_M2_ALG3 to correlate to EMV ARQC verification methods.

The key used for this computation may comprise a session key AUT-Session-Key 1032, as explained above. As explained above, the low order two bytes of the counter may be used to diversify for the one or more MAC session keys. As explained below, AUT-Session-Key 1032 may be used to MAC data 1006, and the resulting data or cryptogram A 1014 and random number RND may be encrypted using DEK-Session-Key 1010 to create cryptogram B or output 1018 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1010 derived from the Card-Key-DEK 1020. In this case, the ATC value for the session key derivation is the least significant byte of the counter pATC 1004.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0 × 43 (Message Type 'A') | Version | pATC | RND | Cryptogram A (MAC) |
| Cryptogram A (MAC) MAC of | 8 bytes | | | |
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0 × 43 (Message Type 'A') | Version | pATC | Cryptogram B |
| Cryptogram A (MAC) MAC of | 8 bytes | | |
| 2 | 8 | 4 | 4 | 18 bytes input data |
| Version | pUID | pATC | Shared Secret | |
| Cryptogram B Sym Encryption of | 16 | | | |
| 8 | 8 | | | |
| RND | Cryptogram A | | | |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version | pUID | pATC | Cryptogram B |
| 8 bytes | | | |
| 8 | | 4 | 4 | 18 bytes input data |
| pUID | pUID | pATC | Shared Secret | |
| Cryptogram B Sym Encryption of | 16 | | | |
| 8 | 8 | | | |
| RND | Cryptogram A | | | |

The UID field of the received message may be extracted to derive, from master keys Iss-Key-AUTH 802 and Iss-Key-DEK 1026, the card master keys (Card-Key-Auth 1008 and Card-Key-DEK 1020) for that particular card. Using the card master keys (Card-Key-Auth 808 and Card-Key-DEK 1020), the counter (pATC) field of the received message may be used to derive the session keys (Aut-Session-Key 1032 and DEK-Session-Key 1010) for that particular card. Cryptogram B 1018 may be decrypted using the DEK-Session-KEY, which yields cryptogram A 1014 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1014, then this indicates that the message decryption and MAC checking have all passed. Then the pATC may be read to determine if it is valid.

During an authentication session, one or more cryptograms may be generated by the one or more applications by the contactless card 700. For example, the one or more cryptograms may be generated as a 3DES MAC using ISO 9797-1 Algorithm 3 with Method 2 padding via one or more session keys, such as Aut-Session-Key 1032. The input data 1006 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x' 00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1012, data 1006 is processed through the MAC using Aut-Session-Key 1032 to produce MAC output (cryptogram A) 1014, which is encrypted.

In order to provide additional protection against brute force attacks exposing the keys on the card, it is desirable that the MAC cryptogram 1014 be enciphered. In some examples, data or cryptogram A 1014 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1010. In the encryption operation 1016, data or cryptogram A 1014 and RND are processed using DEK-Session-Key 810 to produce encrypted data, cryptogram B 1018. The data 1014 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 11 illustrates a method 1100 for generating a cryptogram that may be performed by a contactless card 700. For example, at block 1102, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1104, Issuer Master Keys may be diversified by combining them with the card's unique ID number (pUID) and the PAN sequence number (PSN) of one or more applets, for example, a payment applet.

At block 1106, Card-Key-Auth and Card-Key-DEK (unique card keys) may be created by diversifying the Issuer Master Keys to generate session keys which may be used to generate a MAC cryptogram.

At block 1108, the keys used to generate the cryptogram and encipher the data in the one or more applets may comprise the session keys based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 12 depicts an exemplary process 1200 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1202, and other data, such as data to be protected, which it may secure share with the recipient.

At block 1204, the counter value may be encrypted by the sender using the data encryption master key to produce the data encryption derived session key, and the counter value may also be encrypted by the sender using the data integrity master key to produce the data integrity derived session key.

In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1206, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1208, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1210, the encrypted MAC is transmitted, from the sender (contactless card 700) to the recipient (system 104 via computing device 102), with sufficient information to identify additional secret information (such as shared secret, master keys, etc.), for verification of the cryptogram.

At block 1212, the recipient uses the received counter value to independently derive the two derived session keys from the two master keys as explained above.

At block 1214, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1216, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1202) and a new set of session keys may be created (at block 1210). In some examples, the combined random data may be discarded.

Figure 13:
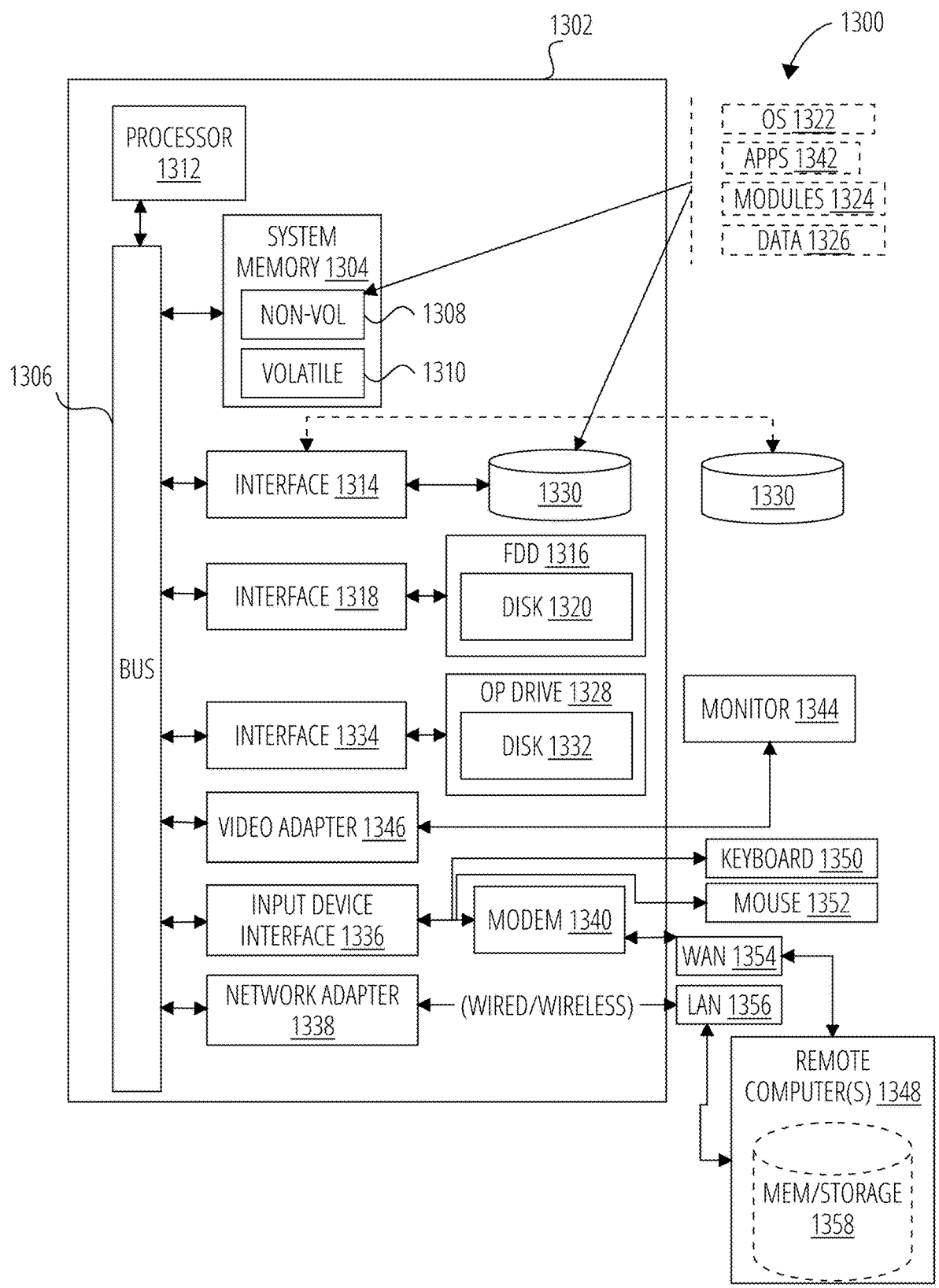
FIG. 13 illustrates a computer architecture 1300 in accordance with embodiments.

FIG. 13 illustrates an embodiment of an exemplary computer architecture 1300 suitable for implementing various embodiments as previously described. In one embodiment, the computer architecture 1300 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 1300.

As shown in FIG. 13, the computer architecture 1300 includes a processor 1312, a system memory 1304 and a system bus 1306. The processor 1312 can be any of various commercially available processors.

The system bus 1306 provides an interface for system components including, but not limited to, the system memory 1304 to the processor 1312. The system bus 1306 can be any of several types of bus structure that may further interconnect to a memory bus (with or without a memory controller), a peripheral bus, and a local bus using any of a variety of commercially available bus architectures. Interface adapters may connect to the system bus 902 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1300 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable the performance of the operations described herein.

The system memory 1304 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid-state memory devices (e.g., USB memory, solid-state drives (SSD) and any other type of storage media suitable for storing information. In the illustrated embodiment shown in FIG. 13, the system memory 1304 can include non-volatile 1308 and/or volatile 1310. A basic input/output system (BIOS) can be stored in the non-volatile 1308.

The computer 1302 may include various types of computer-readable storage media in the form of one or more lower speed memory units, including an internal (or external) hard disk drive 1330, a magnetic disk drive 1316 to read from or write to a removable magnetic disk 1320, and an optical disk drive 1328 to read from or write to a removable optical disk 1332 (e.g., a CD-ROM or DVD). The hard disk drive 1330, magnetic disk drive 1316 and optical disk drive 1328 can be connected to system bus 1306 by an HDD interface 1314, and FDD interface 1318 and an optical disk drive interface 1334, respectively. The HDD interface 1314 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1308, and volatile 1310, including an operating system 1322, one or more applications 1342, other program modules 1324, and program data 1326. In one embodiment, the one or more applications 1342, other program modules 1324, and program data 1326 can include, for example, the various applications and/or components of the systems discussed herein.

A user can enter commands and information into the computer 1302 through one or more wired/wireless input devices, for example, a keyboard 1350 and a pointing device, such as a mouse 1352. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 1312 through an input device interface 1336 that is coupled to the system bus 1306 but can be connected by other interfaces such as a parallel port, IEEE 1394 serial port, a game port, a USB port, an IR interface, and so forth.

A monitor 1344 or other type of display device is also connected to the system bus 1306 via an interface, such as a video adapter 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all the elements described relative to the computer 1302, although, for purposes of brevity, only a memory and/or storage device 1358 is illustrated. The logical connections depicted include wire/wireless connectivity to a local area network 1356 and/or larger networks, for example, a wide area network 1354. Such LAN and WAN networking environments are commonplace in offices and companies, and facilitate enterprise-wide computer networks, such as intranets, all of which may connect to a global communications network, for example, the Internet.

When used in a local area network 1356 networking environment, the computer 1302 is connected to the local area network 1356 through a wired and/or wireless communication network interface or network adapter 1338. The network adapter 1338 can facilitate wire and/or wireless communications to the local area network 1356, which may also include a wireless access point disposed thereon for communicating with the wireless functionality of the network adapter 1338.

When used in a wide area network 1354 networking environment, the computer 1302 can include a modem 1340, or is connected to a communications server on the wide area network 1354 or has other means for establishing communications over the wide area network 1354, such as by way of the Internet. The modem 1340, which can be internal or external and a wire and/or wireless device, connects to the system bus 1306 via the input device interface 1336. In a networked environment, program modules depicted relative to the computer 1302, or portions thereof, can be stored in the remote memory and/or storage device 1358. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application-specific integrated circuits (ASIC), programmable logic devices (PLD), digital signal processors (DSP), field-programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A system configured to authenticate unauthenticated users to perform sensitive actions, comprising:
   one or more processors;
   memory coupled with the one or more processors, the memory to store instructions that when executed by the one or more processors, cause the one or more processors to:
     communicate a first communication to a mobile device, the first communication comprising first data to cause the mobile device to download a mobile application;
     generate a task identifier to identify and launch an authentication operation to perform a specific type of authentication in the mobile application to authenticate a user of the mobile device;
     communicate a second communication to the mobile device, the second communication comprising second data comprising the task identifier, the second data to cause the mobile application to launch and perform the authentication operation associated with the task identifier;
     determine the user is authenticated by the authentication operation; and
     enable the mobile device to perform sensitive actions.

2. The system of claim 1, wherein the authentication operation comprises prompting a user to tap a contactless card on the mobile device, and the one or more processors to:
   receive encrypted data from the contactless card via the mobile device; and
   verify the user is authenticated with the encrypted data based on stored data.

3. The system of claim 2, wherein the encrypted data comprises data stored on the contactless card and is received in response to the contactless card being within a near-field communication range of the mobile device.

4. The system of claim 3, the one or more processors to compare the data of the contactless card to the stored data stored and verify the user if they match.

5. The system of claim 1, wherein the authentication operation comprises prompting a user to provide a picture of an identification card, and the one or more processors to:
   receive the picture of the identification card; and
   verify the user is authenticated with the picture.

6. The system of claim 1, wherein the first data comprises an embedded link to a location on the mobile device to download the mobile application.

7. The system of claim 6, wherein the first communication is a short message service (SMS) message or a rich communication service (RCS) message, and the embedded link is embedded the SMS message or RCS message.

8. The system of claim 1, wherein the task identifier is encoded in the second data, and the second data comprises an embedded link to launch the mobile application and initiate a function to perform the authentication operation based on the task identifier.

9. The system of claim 8, wherein the second communication is a short message service (SMS) message or a rich communication service (RCS) message, and the embedded link is embedded the SMS message or RCS message.

10. The system of claim 1, wherein the authentication operation is performed with the mobile application without the user providing any other authentication information.

11. The system of claim 1, the one or more processors to determine a phone number associated with the mobile device, and the authentication operation further comprising verifying the phone number is associated with user.

12. A computing device configured to authenticate unauthenticated users to perform sensitive actions, comprising:
    processing circuitry;
    memory coupled with the processing circuitry, the memory to store instructions that when executed by the processing circuitry, cause the processing circuitry to:
      receive a first communication from a system to authenticate a user, the first communication comprising first data to install a mobile application;
      install the mobile application based on invocation of the first data;
      receive a second communication from the system, the second communication comprising second data comprising a task identifier to identify a specific type of authentication operation, the second data to cause the mobile application to perform the authentication operation associated with the task identifier;
      initiate the authentication operation of the specific type based on invocation of the second data to determine the user is authenticate; and
      receive an indication that the user is authenticated based on performance of the authentication operation, and the user is enabled to perform sensitive actions.

13. The computing device of claim 12, comprising a wireless interface, and the processing circuitry, to perform the authentication operation, to:
    prompt the user to tap a contactless card on a surface of the computing device, receive, via the wireless interface, encrypted data from the contactless card; and
    verify the user is authenticated with the encrypted data.

14. The computing device of claim 13, and the processing circuitry, to verify the encrypted data, to communicate the encrypted data to the system.

15. The computing device of claim 13, wherein the wireless interface comprises a near-field communication (NFC) interface, and the encrypted data is received from the contactless card as part of an NFC exchange.

16. The computing device of claim 12, comprising a camera, and the processing circuitry, to perform the authentication, to:
   prompt the user to provide a picture of an identification card; and
   communicate the picture to the system.

17. The computing device of claim 12, wherein the first data comprises an embedded link to a mobile application store to download the mobile application, and the processing circuitry to receive an input on the embedded link, execute the mobile application store to download the mobile application, and download the mobile application.

18. The computing device of claim 12, wherein the task identifier is encoded in the second data, and the second data comprises an embedded link to launch the mobile application and initiate a function to perform the authentication operation based on the task identifier.

19. The computing device of claim 12, wherein the authentication operation is performed with the mobile application without the user providing any other authentication information.

20. The computing device of claim 12, the processing circuitry to provide a phone number associated with computing device to the system to perform the authentication operation.

* * * * *